United States Patent [19]
Chomyszak

[11] Patent Number: 5,233,954
[45] Date of Patent: Aug. 10, 1993

[54] TOROIDAL HYPER-EXPANSION ROTARY ENGINE, COMPRESSOR, EXPANDER, PUMP AND METHOD

[75] Inventor: Stephen M. Chomyszak, Attelboro, Mass.

[73] Assignee: Mechanology, Millbrae, Calif.

[21] Appl. No.: 736,684

[22] Filed: Jul. 26, 1991

Related U.S. Application Data

[63] Continuation-in-part of Ser. No. 531,501, May 31, 1990, abandoned, which is a continuation-in-part of Ser. No. 471,845, Jan. 26, 1990, abandoned, which is a continuation-in-part of Ser. No. 392,450, Aug. 11, 1989, abandoned.

[51] Int. Cl.$^5$ .............................................. F02B 53/00
[52] U.S. Cl. .................................... 123/221; 418/195; 418/207
[58] Field of Search ............... 123/221, 232, 233, 239; 418/195, 207

[56] References Cited

U.S. PATENT DOCUMENTS

| | | | |
|---|---|---|---|
| 1,618,360 | 2/1927 | Wellman, Jr. | 123/221 |
| 2,674,982 | 4/1954 | McCall | 123/221 |
| 3,208,437 | 9/1965 | Coulter | 123/221 |
| 3,809,022 | 5/1974 | Dean | 123/221 |
| 3,841,276 | 10/1974 | Case | 123/221 |

FOREIGN PATENT DOCUMENTS

| | | | |
|---|---|---|---|
| 91975 | 10/1983 | European Pat. Off. | 123/221 |
| 936283 | 9/1963 | United Kingdom | 123/221 |

*Primary Examiner*—Michael Koczo
*Attorney, Agent, or Firm*—Flehr, Hohbach, Test, Albritton & Herbert

[57] ABSTRACT

An intersecting vane machine (300), based upon toroidal geometry, has a primary rotor (302) and a plurality of secondary rotors (304). The rotor (302) has a plurality of primary vanes (314) in between which exists primary chambers (316). The rotors (304) have a plurality of secondary vanes (318) in between which exist secondary chambers (320). The machine (300) achieves a cyclic positive displacement pumping action by the interaction of the primary vanes (314) with the secondary vanes (318) as the primary rotor (302) and the secondary rotors (304) rotate. The volumetric ratios between the primary chambers (316) and the secondary chambers (320) are configurable and can be made equal or unequal to one another.

49 Claims, 34 Drawing Sheets

FIG. II

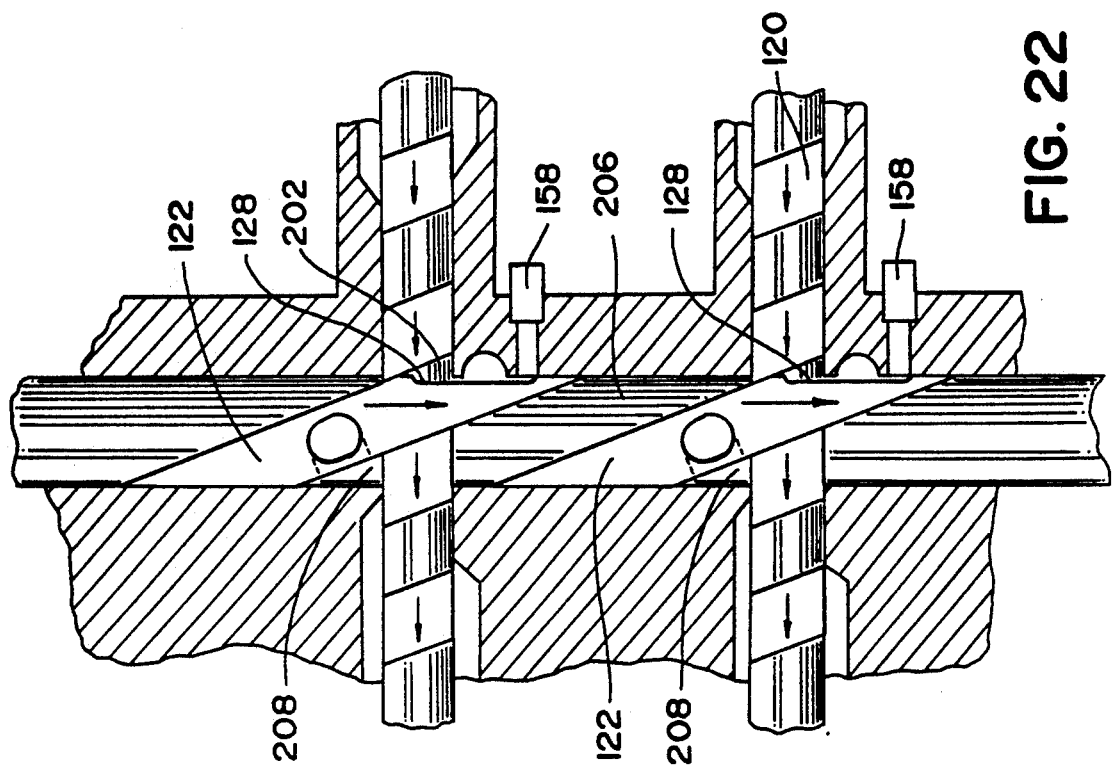
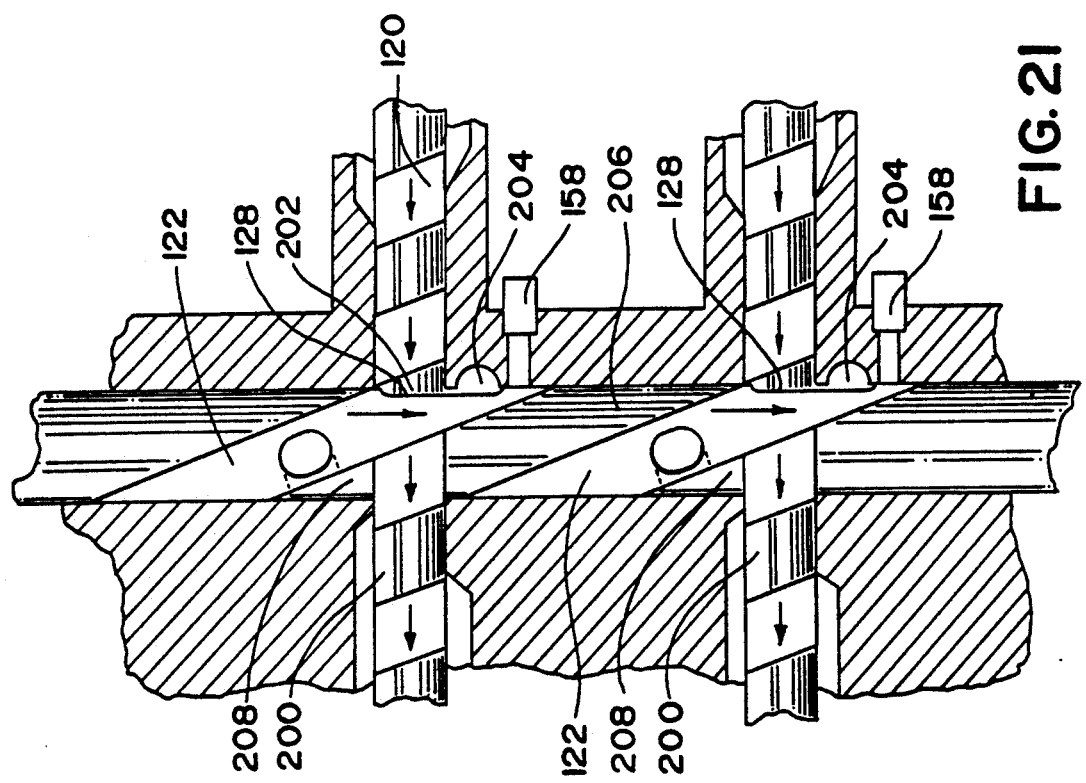

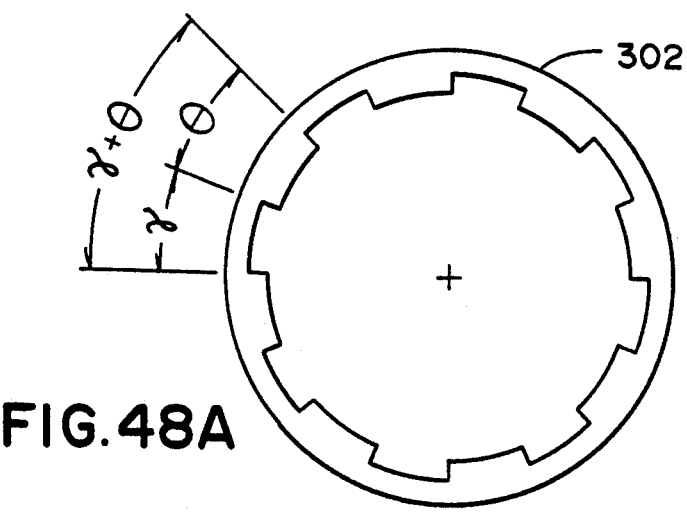
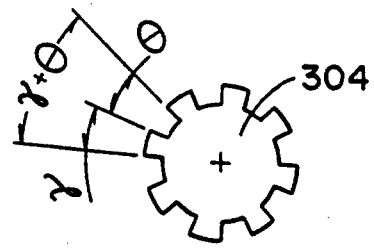
FIG.48A  FIG.48B
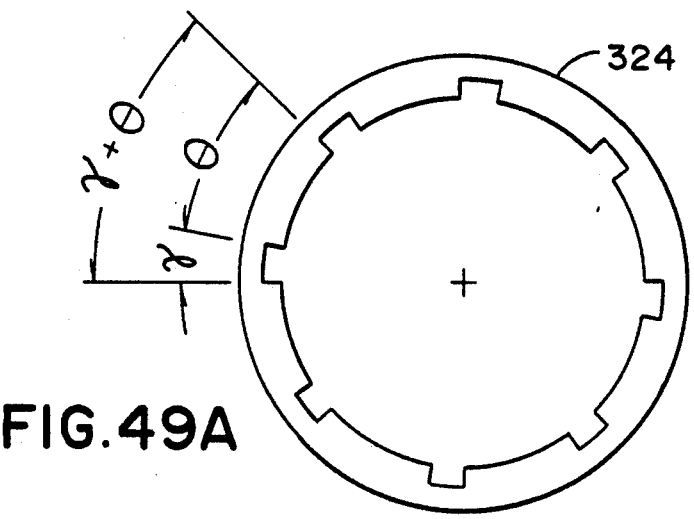
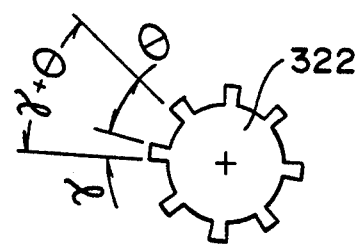
FIG.49A  FIG.49B
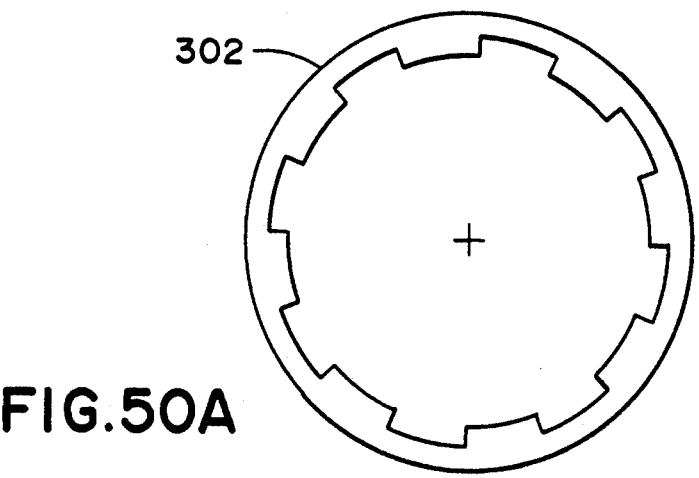
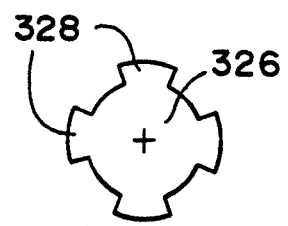
FIG.50A  FIG.50B

TOROIDAL HYPER-EXPANSION ROTARY ENGINE, COMPRESSOR, EXPANDER, PUMP AND METHOD

ORIGIN OF THE APPLICATION

This application is a continuation-in-part of my U.S. patent application Ser. No. 07/531,501, filed May 31, 1990, now abandoned which is in turn a continuation-in-part of U.S. patent application Ser. No. 07/471,845, filed Jan. 26, 1990, now abandoned, which is in turn a continuation-in-part of my U.S. patent application Ser. No. 07/392,450, filed Aug. 11, 1989, now abandoned.

BACKGROUND OF THE INVENTION

1. Field of the Invention

The present invention relates generally to a positive displacement intersecting vane machine and method which can be utilized as an engine, compressor, expander or pump having two or more rotors oriented such that, as they concentrically rotate, they provide sufficient changes in volume, allowing a cyclic pumping action to take place which enables the intake, compression, expansion, exhaust or any combination thereof of a suitable fluid. More particularly, it relates to such a machine in which the volumetric ratios between any and all of the above phases can be altered. The ability to bias volumetric ratios has a beneficial impact upon a thermodynamic cycle when the machine is configured to operate as a combustion engine. The same ability could, in turn, beneficially impact the thermodynamic cycle when the machine is configured to operate as a refrigeration device.

2. Description of the Prior

Machines incorporating intermeshing rotors, primarily configured to operate as combustion engines, are known in the art. For example, such engines are shown in the following U.S. Pat. No. 1,618,360, issued Feb. 22, 1927 to Wellman; No. 2,674,982, issued Apr. 13, 1954 to McCall; No. 3,060,910, issued Oct. 30, 1962 to McCall; No. 3,208,437, issued Sep. 28, 1965 to Coulter; No. 3,502,054, issued Mar. 24, 1970 to Hambric; No. 3,751,193, issued Aug. 7, 1973 to McCall; No. 3,809,022, issued May 7, 1974 to Dean Jr. and No. 3,841,276, issued Oct. 15, 1974 to Case. Such engines are also shown in European Patent 936,283, issued Sep. 11, 1963 to ANZUG VERSUCH-ANSTALT and European Patent Application 8210323.3 dated Oct. 26, 1983 by Ingelheim. While this prior art shows the feasibility of the general concept of intersecting vane machinery, the designs disclosed do not take full advantage of the potential efficiencies of such machines when utilized as positive displacement devices.

SUMMARY OF THE INVENTION

Accordingly, it is an object of this invention to provide an intersecting vane machine incorporating intermeshing rotors to form primary and secondary chambers whose volumetric ratios can be altered and optimized to take full advantage of the potential efficiencies and design flexibility offered by such machinery.

It is another object of the invention to provide an intersecting vane machine in which the general geometry of the intersecting vanes are based upon a torus.

It is a further object of the invention an intersecting vane machine in which the meshing surfaces of the intersecting vanes are substantially configured as a helix generated about a torus.

It is still another object of the invention to provide an intersecting vane machine in which each of two intermeshing rotors are configured so as to allow interaction at more than one location.

It is yet a further object of the invention to provide an intersecting vane machine allowing for a very dense mechanical consolidation of components.

It is a still further object of the invention to provide an intersecting vane machine with a geometry sufficient to allow a clearance volume to form dynamically while substantially reducing leakage and operational inefficiencies.

It is another object of the invention to provide an intersecting vane machine whose components are supported in an easily assembled, modular supporting structure.

It is a further object of the invention to provide an intersecting vane machine which, when configured as a combustion engine, has a substantially extended intake duration to benefit volumetric efficiency.

It is a further object of the invention to provide an intersecting vane machine whose effective displacement can be substantially decreased or increased without an increase in the machine's overall size if so desired.

It is still a further object of the invention to provide an intersecting vane machine which, when configured as a combustion engine, allows the use of direct fuel injection without continually exposing the injectors to the high temperatures of combustion.

It is another object of the invention to provide an intersecting vane machine which, as an engine, allows each phase of the engine's thermodynamic cycle to be customized.

The attainment of these and related objects may be achieved through use of the novel toroidal hyper-expansion rotary engine herein disclosed. The invention has two or more rotors rotatably mounted within a supporting structure so that the vanes of each of the rotors passes through a common region or intersection Between the vanes of each rotor exists chambers which contain and exchange a working fluid. Changes in volume of the chambers are made possible by the interaction of the vanes. Because the rotors and their vanes continuously rotate, they create a cyclic positive displacement pumping action which enables the processing of a working fluid. If heat is added to the process then the machine can be used as an engine. If heat is removed from the process then the machine can be used as a refrigeration device.

Toroidal geometry, on which this invention and its following embodiments are based, provides a very flexible design platform. Not only does it allow for a very compact mechanical package but provides numerous attributes which can be adjusted so as to optimize the pumping action and benefit the thermodynamic cycles which the invention utilizes. A key feature of this invention is its ability to allow configurable volumetric ratios between the initial and final volume of its working fluid. As will be shown in the case of an engine, this one feature provides the ability for significant increases in thermal efficiency.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 20-24 are sequential diagrams of a portion of the engine of FIGS. 10-15, showing its operation.

FIGS. 48A-48B, 49A-49B and 50A-50B are plan views of different rotor configurations used in the intersecting vane machines of FIGS. 10-15 and FIG. 45.

DETAILED DESCRIPTION OF THE INVENTION

Figure 1:
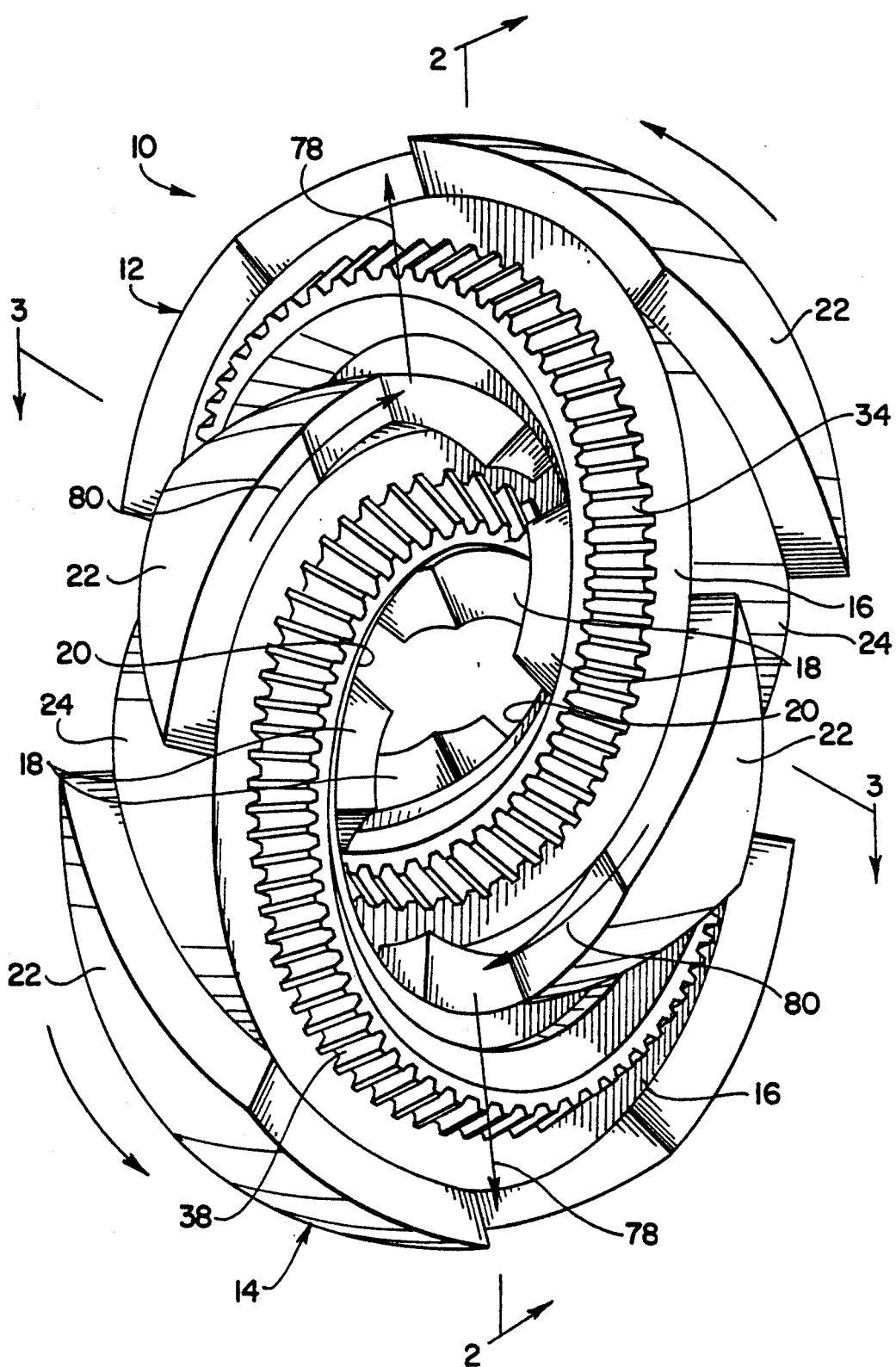
FIG. 1 is a perspective view of a portion of an engine in accordance with the invention.

Turning now to the drawings, more particularly to FIG. 1, there is shown a portion of an engine 10 in accordance with the invention. The engine 10 has a pair of intermeshing rotors 12 and 14. In addition to intermeshing, the rotors 12 and 14 are interlocked by having each rotor 12 and 14 pass through a center portion of the other rotor 14 and 12. Each of the rotors 12 and 14 consists of a wheel 16 supporting secondary vanes 18 on inner surface 20 of each rotor 12 and 14 and primary vanes 22 on outer surface 24 of each rotor 12 and 14. The wheel 16 of each rotor 12 and 14 also provides for the attachment of components to the side of the wheel 16 which allow useful work to be extracted from the rotors 12 and 14 as they spin, such as gears, pulleys, and cams, and for any necessary bearings or bearing surfaces to provide support for the rotors 12 and 14. In FIG. 1, the rotors 12 and 14 are each shown with four secondary vanes 18 and four primary vanes 22; however, the number of vanes is not limited to four.

In operation of the engine 10, the secondary vanes 18 of rotor 12 interact with the primary vanes 22 of rotor 14, and the secondary vanes 18 of rotor 14 interact with the primary vanes 22 of rotor 12. This interaction allows both rotors 12 and 14 to produce useful work.

Figure 2:
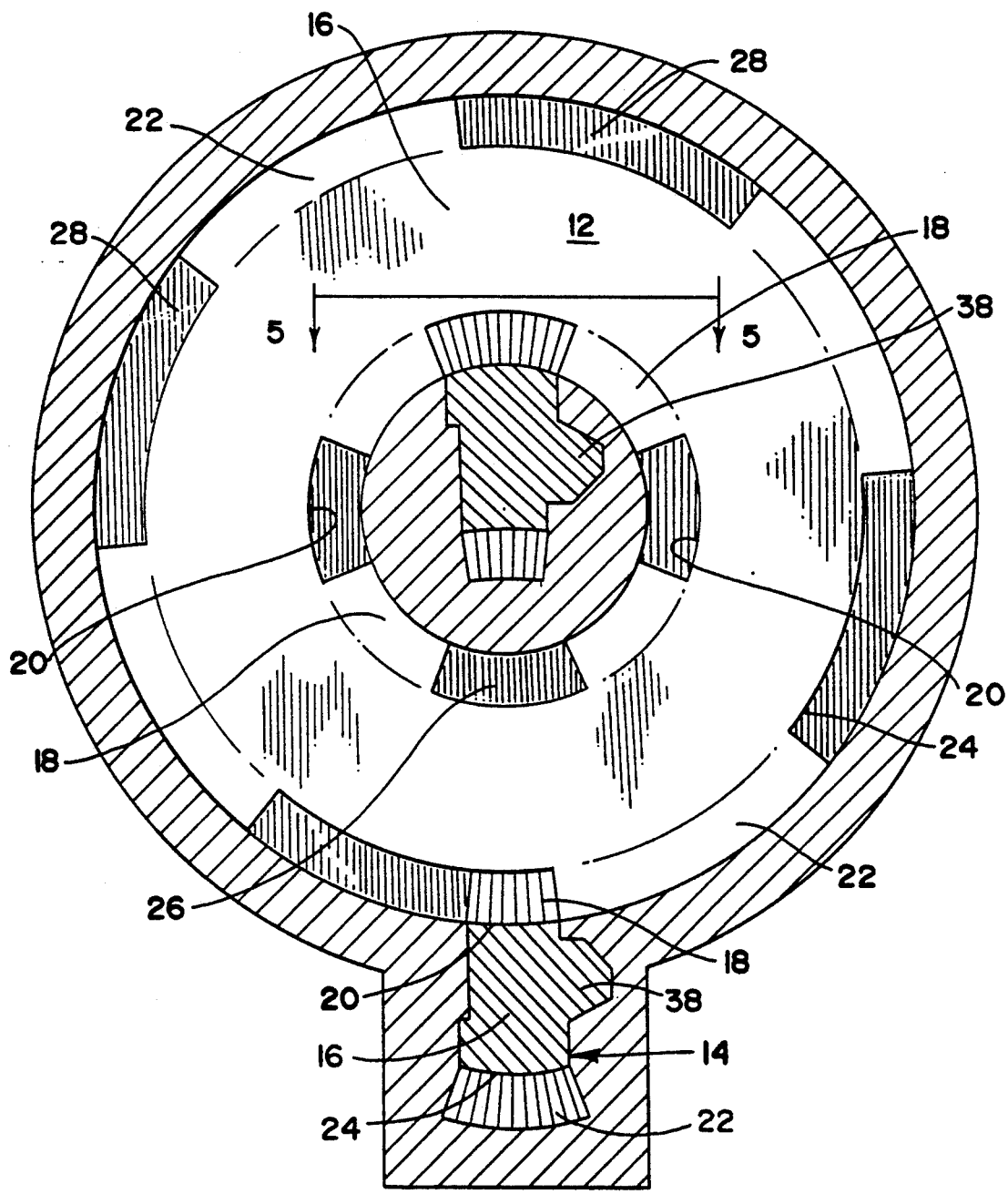
FIG. 2 is a somewhat schematic cross-section view, taken generally through the line 2—2 in FIG. 1.
Figure 3:
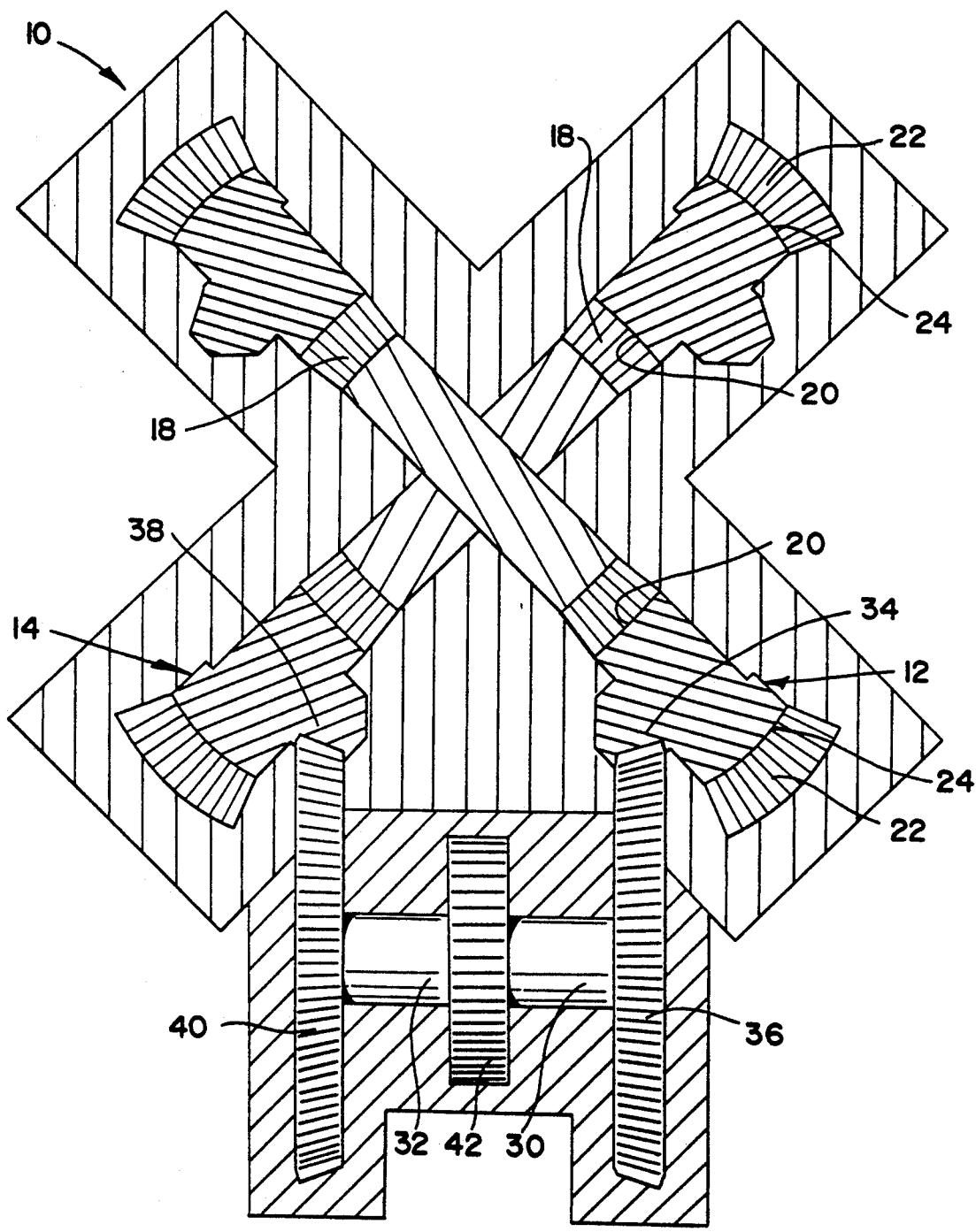
FIG. 3 is a cross-section view, taken along the line 3—3 in FIG. 1, but with additional structure of an engine in accordance with the invention.
Figure 4:
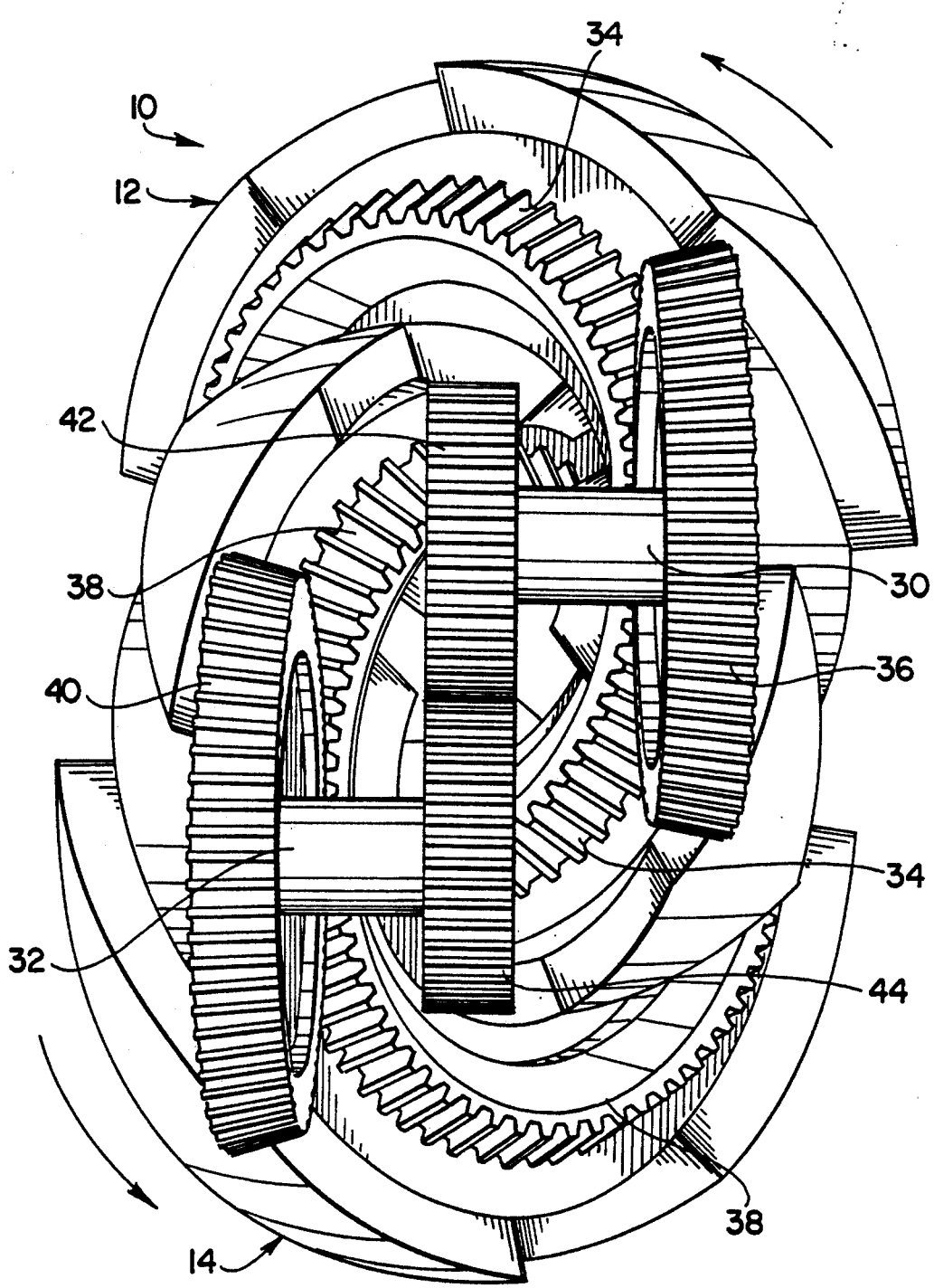
FIG. 4 is a perspective view corresponding to that of FIG. 1, but with the additional structure shown in FIG. 3 in place.

FIG. 2 shows a cross-section of the rotor 14 as it interacts with the rotor 12. This figure shows general cross-sections of the secondary and primary vanes 18 and 22, as well as the inherent toroidal geometry of the rotors 12 and 14. As shown, the thickness of the wheel 16 need not be consistent from the secondary vane 18 to the primary vane 22. This change in thickness is one of the features utilized to increase the expansion ratio from intake volume of the secondary chamber 26 to expansion volume of the primary chamber 28, called "hyper-expansion" in this application. The other feature of the rotor geometry used to allow hyper-expansion is the difference in mean diameters between the secondary vanes 18 and the primary vanes 22. The hyper-expansion of the intake volume of chambers 26 into the expansion volume of the chambers 28 following combustion is a most important aspect of the engine 10. This hyper-expansion allows for increased thermodynamic efficiencies. FIGS. 3 and 4 show the two rotors 12 and 14 engaged to output shafts 30 and 32 by bevel gears 34, 36, 38 and 40. The output shafts 30 and 32 are in turn engaged with each other by spur gears 42 and 44 (FIG. 4). The output shafts 30 and 32 provide a means of power take-off from each of the rotors 12 and 14 and help to synchronize the rotors 12 and 14 as they spin.

It is possible to arrange the vanes 18 and 22 of each rotor 12 and 14 so that there is no way except catastrophic failure for the rotors 12 and 14 to fall out of synchronization without the output shafts, but this would make it necessary for one of the rotors 12 and 14 to drive the other via their respective vanes 18 and 22. This is not impossible, but would require more study of the most efficient surface needed to provide adequate sealing between vanes 18 and 22 and the least amount of friction generated while driving the rotors 12 and 14.

Figure 8:
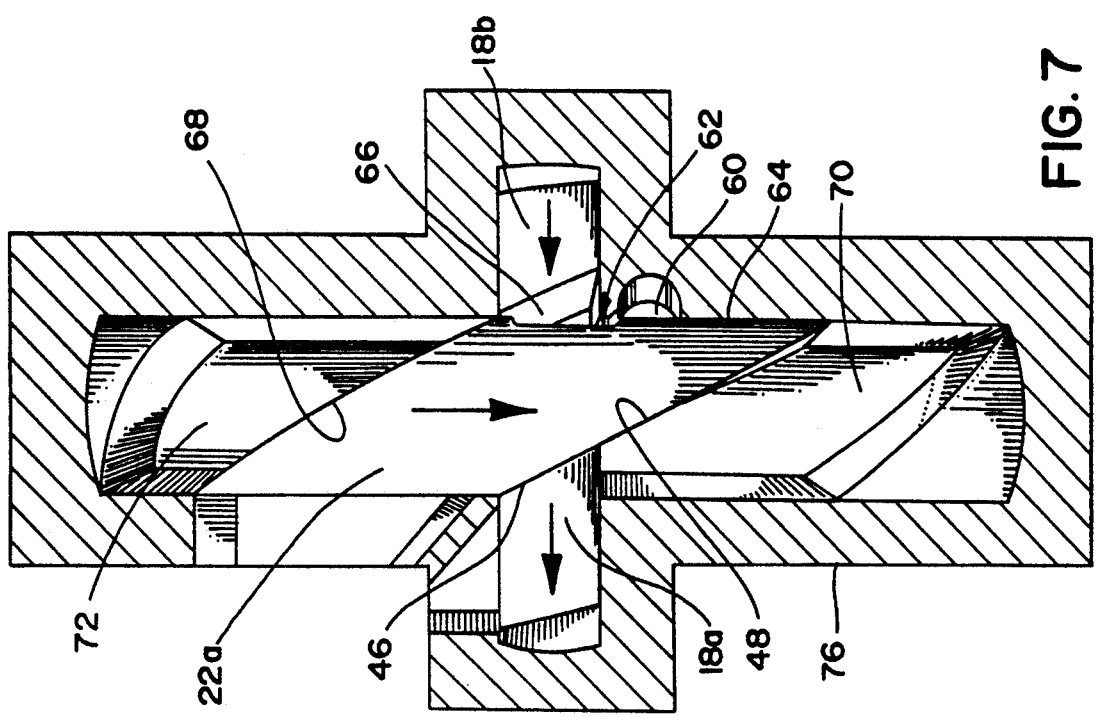
Figure 9:
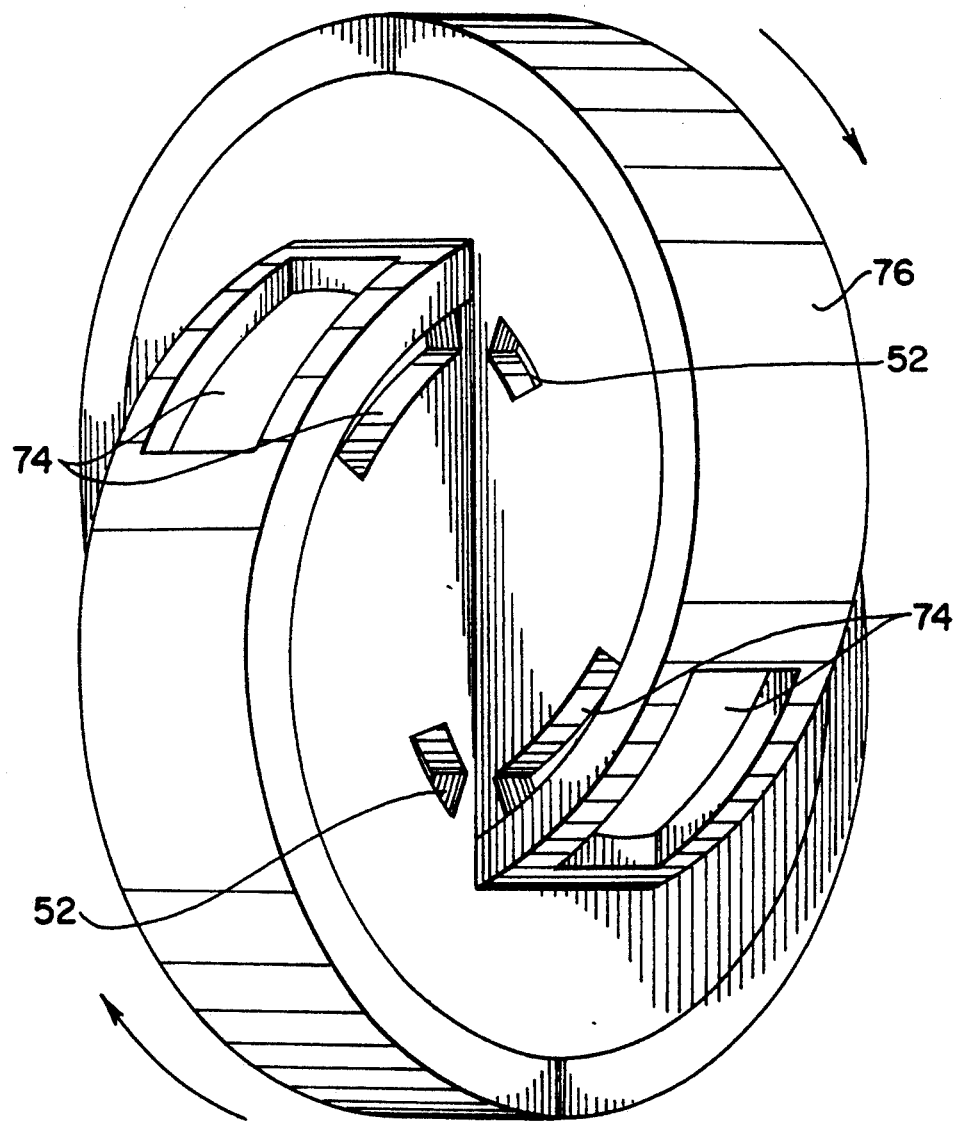
FIG. 9 is an external perspective view of the engine of FIGS. 1-8.

The thermodynamic cycle of the engine 10 consists of four separate and distinct phases: intake, compression, hyper-expansion and exhaust. FIGS. 5-8 show how each of the cycles is achieved by the interaction of the secondary vanes 18 with the primary vanes 22. FIG. 9 shows placement of intake ports 52 and exhaust ports 74 on engine block 76.

INTAKE

Figure 6:
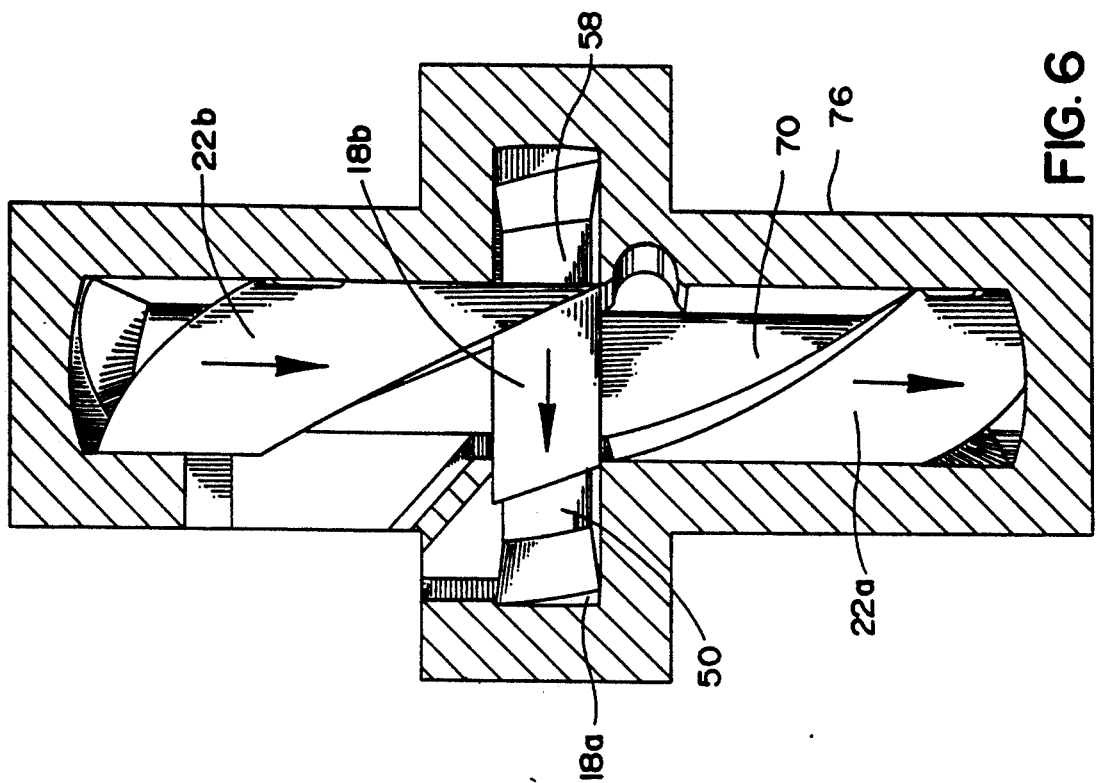
FIGS. 5-8 are successive cross-section views, taken along the line 5—5 in FIG. 2, showing operation of the engine of FIGS. 1-4.
Figure 5:
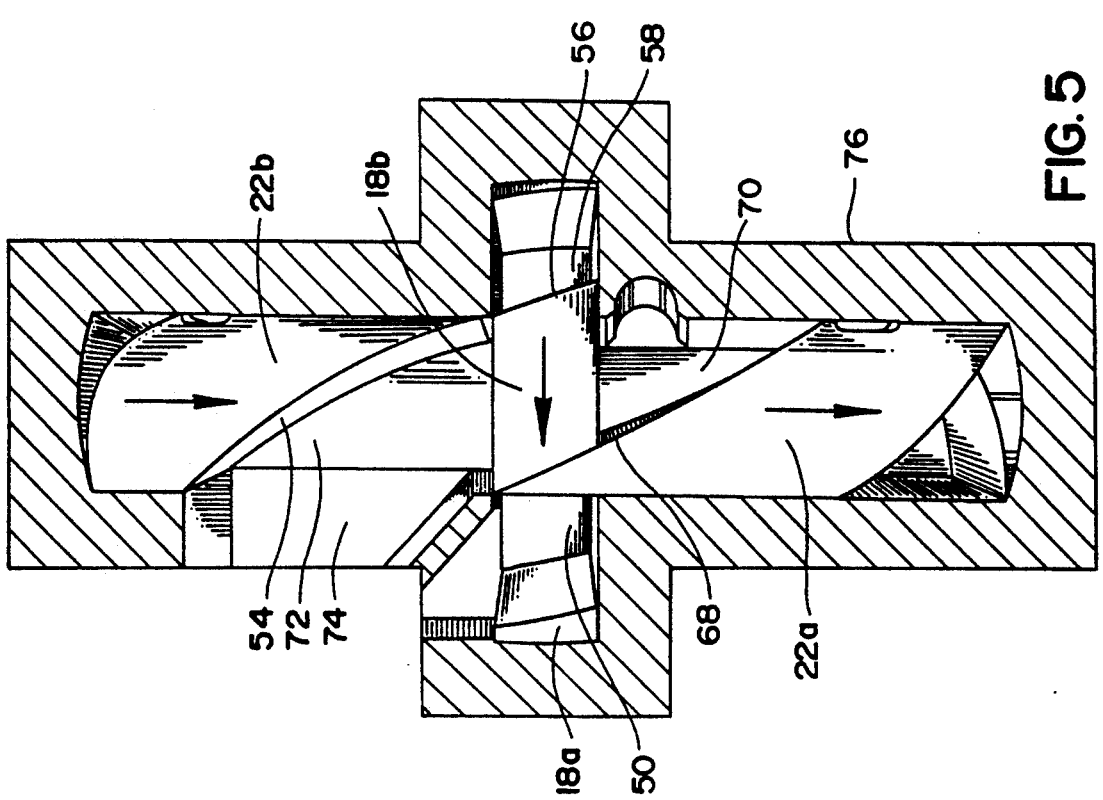
Figure 7:
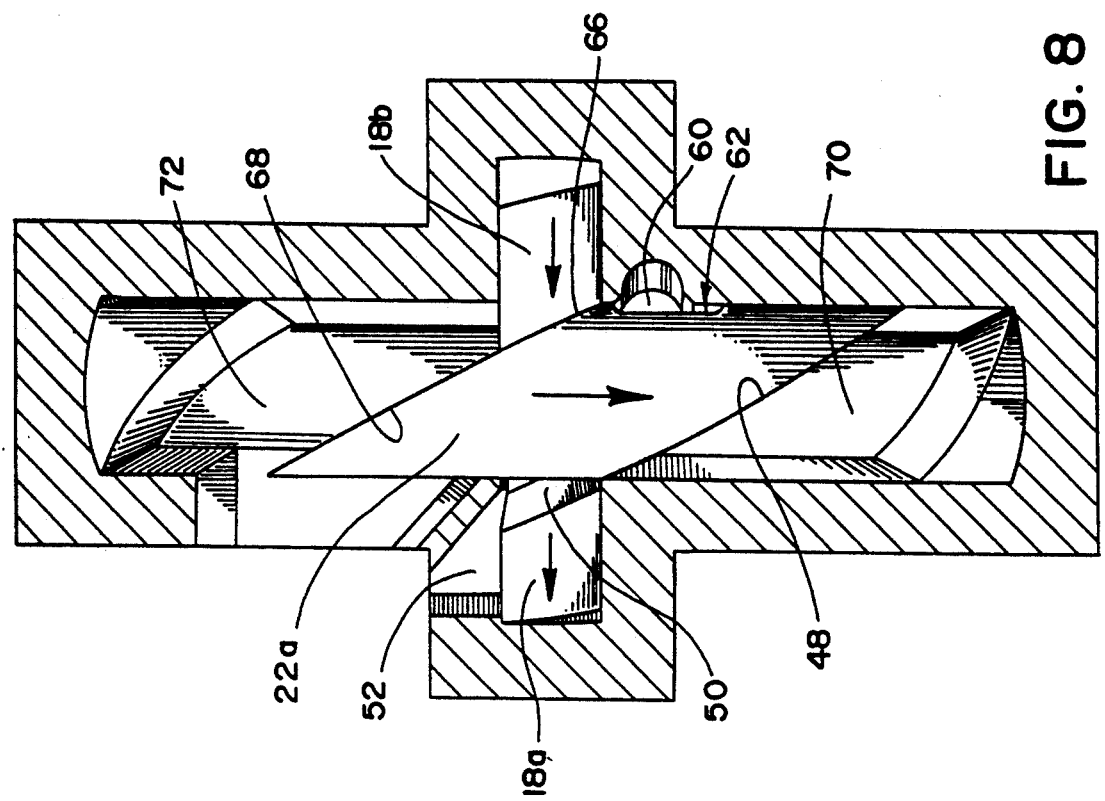

FIG. 7 shows trailing edge 46 of secondary vane 18a in complete engagement with leading edge 48 of primary vane 22a. FIG. 8 shows the beginning of formation of an intake chamber 50 as the secondary vane 18a begins to disengage the primary vane 22a. The intake chamber 50 communicates with intake port 52, which supplies the intake chamber 50 with a working fluid due to the partial vacuum created as the intake chamber 50 continues to get larger, as shown in FIG. 5. By FIG. 6, the intake chamber 50 has reached full volume.

The intake volume of each intake chamber 50 is dependent on the number of chambers per rotor 12 and 14. The number of chambers 50 for each rotor 12 and 14 must be equal. The volumetric efficiency of the chambers 50 is very high, due to the substantial amount of intake duration which is provided. Approximately 75 percent of the complete cycle time can be used for intake for each chamber. A conventional reciprocating engine allows around thirty percent of the cycle time to fill its cylinders. Also, both rotors 12 and 14 can share a common intake manifold (not shown) into the engine 10, which makes the need for complicated manifolds unnecessary. This results in a very uniform distribution of air to each chamber 50 of each rotors 12 and 14. The chambers 50 are filled through ports 52, so there is no need for valves and their associated hardware.

COMPRESSION

FIG. 5 shows leading edge 54 of primary vane 22b just prior to engaging trailing edge 56 of secondary vane 18b and the beginning of formation of compression chamber 58. The working fluid is compressed as the volume of compression chamber 58 gets smaller, as shown in FIG. 6. FIG. 7 shows the partially compressed working fluid transferred to combustion chamber 60 via passage 62 in side 64 of the primary vane 22a. In FIG. 8, the working fluid is compressed into the combustion chamber 60 and passage 62. At this point, combustion takes place. Combustion can be initiated either from an ignition device or by compression ignition as in the Diesel Cycle.

The method of compression of the working fluid of engine 10 provides an inherent means to generate turbulence within the air-fuel mixture. Turbulence is a desired characteristic during the combustion process. The air-fuel mixture is compressed into a clearance volume to provide a suitable compression ratio. Due to the shape of the vanes 18 and 22 and the location of the clearance volume, which is also the combustion chamber, the gas will undergo a number of directional changes, which induce turbulence.

HYPER-EXPANSION

In FIG. 8, leading edge 66 of secondary vane 18b is in full engagement with trailing edge 68 of the primary vane 22a. The vanes 18b and 22a will remain in full engagement for some time as hyper-expansion chamber 70 is formed, as shown in FIG. 5. The hyper-expansion chamber 70 continues to grow through FIGS. 6 and 7, until reaching its full volume in FIG. 8.

It was mentioned earlier that the gases which are heated by combustion are allowed to expand into a volume which is substantially larger than the original intake volume. They do so in approximately 25 percent of the total cycle time. A conventional engine allows the gases to expand in approximately 20 percent of its total cycle time. Although this appears to be better at first, because heat loss is dependent on time, it should be considered that the conventional engine is only allowing the gases to expand into the original intake volume. The engine 10 allows the expansion of the gases into the original intake volume in eight percent of the cycle time and 3.5 times the intake volume in 25 percent of the total cycle time.

EXHAUST

In FIG. 7, the leading edge 66 of the secondary vane 18b is just beginning engagement with the trailing edge 68 of primary vane 22a to begin reduction in volume of exhaust chamber 72, as shown in FIG. 8. The exhaust chamber 72 continues to shrink in volume, FIGS. 5 and 6, thereby forcing the exhaust fluid through exhaust port 74.

Due to the overlap in thermodynamic phases within the engine 10, the exhaust gases can remain inside the engine for up to 75 percent of the total cycle time, or they can be allowed to escape immediately following the completion of the hyper-expansion phase. Due to the sufficient amount of expansion, the gases can approach temperatures which are 1000 degrees Fahrenheit cooler than those of a conventional reciprocating engine. This lowered temperature and accordingly, pressure, will also lower the amount of potential noise generated by the exhaust process. By being able to contain the exhaust gas for an extended period of time, it is possible to use the exhaust gas to aid sealing and/or any potential thermal requirements of the engine 10. For example, they could be used to provide at least part of the necessary heat required to begin the combustion process and do away with a conventional ignition system. Because of the reduced exhaust temperatures, it may be possible to operate the engine 10 without a cooling system.

FUEL DELIVERY

Because the engine 10 is rotary in nature and because of the extended intake duration, if carbureted, the centrifugal forces would tend to separate the fuel from the air and would result in poor mixture quality. The better solution is to use direct fuel injection. Although direct injection requires higher injection pressures to overcome gas pressures during the compression phase, better results can be achieved over indirect fuel injection. One of the pitfalls for direct injection is that the tip of the injector is directly exposed to the heat of combustion, which can reach temperatures of 5000 degrees Fahrenheit. This tends to erode the tip of the injectors and sacrifice their longevity. The engine 10 (when not utilizing Diesel cycles) is such that it will allow direct injection during the compression phase and then mask the tip of the injector during the combustion process with the secondary vanes 18 and prevent the typical high temperature erosion of the injectors. Also, the secondary vanes 18 could also act as timing devices to control the injectors. The injectors can therefore be of the constant flow type without a need for complicated timing controls. The delivery rate could be simply controlled by varying the pressure and/or flow rate of the fuel pump or by electrically adjusting metering needles in the injectors themselves.

IGNITION

There are two combustion chambers; one for each rotor. This also means that there are two ignition points. The ignition could be done with conventional spark plugs and timing devices; however, at the proposed mechanical design limit for the current version of 25,000 RPM and four intake and four exhaust chambers per rotor, this translates to 100,000 ignition events per rotor per minute. This may require the development of alternative ignition approaches, such as use of the heat in the exhaust gases or a laser ignition.

LUBRICATION

Lubrication could be provided with the fuel, as in two cycle engines, or with an external pressurized supply, such as an oil pump. An interesting phenomenon that can be utilized for lubrication is that the arrangement and interaction of the rotors 12 and 14 makes for a recycling centrifugal pump. If oil is introduced towards the center of one rotor, it will be thrown to the outside of that rotor by centrifugal force, as indicated by the arrows 78 in FIG. 1. Because the outside of one rotor interacts with the inside of the other rotor, the oil will then be transferred to the inside of the other rotor, as indicated by arrows 80, where it will then be thrown to the outside of that rotor and picked up by the inside of the original rotor and recycled through the same chain of events.

THERMODYNAMICS

Figure 26:
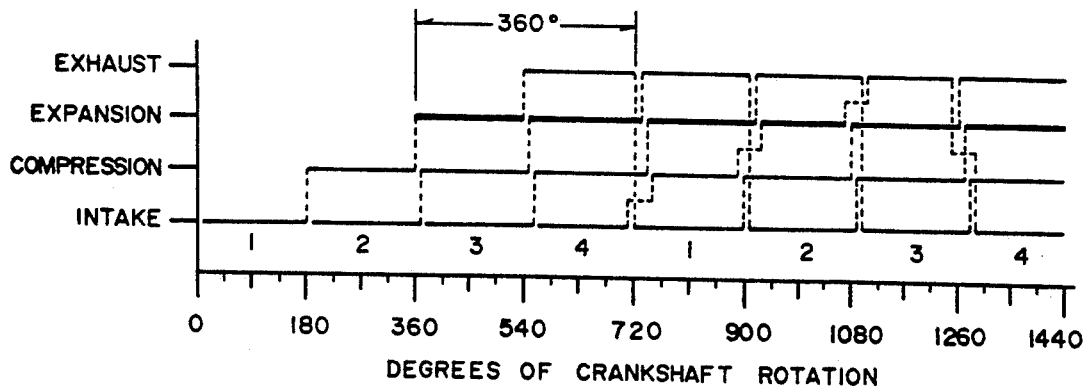

The following calculations in Tables I–XIII comparing a conventional reciprocating engine and the rotary engine 10 are based on the fuel-air cycle approximation as described in A. R. Rogowski, Elements of Internal Combustion Engines, McGraw-Hill, 1953, pp. 57–65. The calculations assume a frictionless adiabatic process and rely upon two charts of thermodynamic properties: FIG. 26, page 59 and FIG. 27, a separate sheet enclosed with the book.

Listing of Variables $P(n)$ = Pressure at pertinent stage of cycle (psia).
$T(n)$ = Temperature at pertinent stage of cycle (degrees Rankine).
$V(n)$ = Volume of fuel-air mixture at pertinent stage of cycle in cubic feet.
$r$ = Compression Ratio.
$Es(n)$ = Internal Sensible Energy at pertinent stage of cycle (Btu)
$Ec$ = Chemical Energy (Btu).
$E$ = Total Internal Energy (Btu) = $Es + Ec$.
$f$ = wt. of residual gas / total wt. of chart contents.
Other variables are described as they are used in the remainder of the calculations.

TABLE I

INITIAL CONDITIONS AT END OF INTAKE OF FRESH AIR AND FUEL

The thermodynamic charts used for these calculations are normalized to one pound of air. Under these initial conditions, one pound of air equals 13.8 cubic feet. Hence, the intake volume of each engine shall equal 13.8 cubic feet.

| CONVENTIONAL | HYPER-EXPANSION |
|---|---|
| P1 = 14.7 psia | P1 = 14.7 psia |
| T1 = 540 R | T1 = 540 R |
| V1 = 13.8 cubic ft | V1 = 13.8 cubic ft |
| r = 10 | r = 10 |
| Es1 = 8 Btu | Es1 = 8 Btu |

TABLE II

CONDITIONS AT END OF COMPRESSION PHASE

Compression Ratio (r) = 10:1
V2 = V1/r
Residual gas (f) = T1/2500r = 540/2500/10 = 0.0216
Chemical Energy (Ec) prior to combustion:
Ec = (1-f)1507 + 300f
Ec = (1-0.0216)1507 + 0 300(0.0216) = 1481 Btu

| CONVENTIONAL | HYPER-EXPANSION |
|---|---|
| P2 = 310 psia | P2 = 310 psia |
| T2 = 1160 R | T2 = 1160 R |
| V2 = 1.38 cubic ft | V2 = 1.38 cubic ft |
| Es2 = 142 Btu | Es2 = 142 Btu |
| Ec = 1481 Btu | Ec = 1481 Btu |
| E2 = Es2 + Ec = 1623 Btu | E2 = Es2 + Ec = 1623 Btu |

TABLE III

ADDITION OF HEAT DUE TO COMBUSTION OF FUEL

| CONVENTIONAL | HYPER-EXPANSION |
|---|---|
| P3 = 1575 psia | P3 = 1575 psia |
| T3 = 5150 R | T3 = 5150 R |
| V3 = 1.38 cubic ft | V3 = 1.38 cubic ft |
| E3 = 1623 Btu | E3 = 1623 Btu |

Up to this point, the phases of each of the respective cycles have been identical. The same amounts of fresh air with the same amounts of fuel were compressed by the same compression ratio of 10:1 and then an equal amount of heat was added by the burning of the fuel. The hot gas of the Conventional engine is now allowed to expand back into its original volume of 13.8 cubic feet while the hot gas of the Hyper-Expansion engine expands into 48.3 cubic feet which is an expansion ratio of 3.5:1.

TABLE IV

EXPANSION OF HEATED GASES

| CONVENTIONAL | HYPER-EXPANSION |
|---|---|
| P4 = 90 psia | P4 = 18.5 psia |
| T4 = 2975 R | T4 = 2100 R |
| V4 = 13.8 cubic ft | V4 = 48.3 cubic ft |
| E4 = 915 Btu | E4 = 672 Btu |

Notice the substantial difference in the final temperature, T4, and pressures, P4, after the expansion phase. This indicates that the Hyper-Expansion engine has the thermodynamic capability of extracting more work from the same amount of hot gas than the Conventional engine.

TABLE V

WORK PER CYCLE
$(E_3-E_4) - (E_{s2}-E_{s1}) = $ Btu

| CONVENTIONAL | HYPER-EXPANSION |
|---|---|
| (1623−915) − (142−8) = | (1623−672) − (142−8) = |
| 574 Btu | 817 Btu |

TABLE VI

ENERGY INPUT
(Fuel wt.)(Heating Value) =
$(1-f)F \times 19,270 = $ Btu

| CONVENTIONAL | HYPER-EXPANSION |
|---|---|
| (1−0.0216)1507(19,270) = | (1−0.0216)1507(19,270) = |
| 1474 Btu | 1474 Btu |

TABLE VII

INDICATED THERMAL EFFICIENCY
work output / heat input

| CONVENTIONAL | HYPER-EXPANSION |
|---|---|
| 574 Btu/1474 Btu = 0.39 | 817 Btu/1474 Btu = 0.55 |

TABLE VIII

INDICATED MEAN EFFECTIVE PRESSURE

MEP = (work per cycle)(J)/Vd
J = 778 ft-lb per Btu
Vd = (V1−V2)(144 sq.in./sq. ft.)
Vd = (13.8−1.38)(144) = 1788.5 cubic inches

| CONVENTIONAL | HYPER-EXPANSION |
|---|---|
| (574 Btu)(778)/1788.5 = | (817 Btu)(778)/1788.5 = |
| 250 psia | 355 psia |

Because all of the above calculations were based upon a highly idealized cycle, it is currently the acceptable practice to lower the theoretical results by thirty percent. This is done to compensate for the heat loss characteristics of the engines, assuming those characteristics to be the same for each engine, therefore establishing the following:

TABLE IX

CORRECTED THERMAL EFFICIENCY

| CONVENTIONAL | HYPER-EXPANSION |
|---|---|
| 0.39 × 0.7 = 0.27 | 0.55 × 0.7 = 0.39 |

TABLE X

CORRECTED MEAN EFFECTIVE PRESSURE

| CONVENTIONAL | HYPER-EXPANSION |
|---|---|
| 250 psia × 0.7 = 175 psia | 355 psia × 0.7 = 248.5 psia |

Now let us put these figures into a more meaningful form: that of Horsepower and Specific Fuel Consumption. Because the timing of the phases of the thermodynamic cycle of the invention most closely resembles that of a two-stroke reciprocating engine, we will use the results of TABLE X to compare two such engines. The first engine is a conventional two-stroke engine and the second is a two-stroke engine which fully utilizes the benefits of Hyper-Expansion.

TABLE XI

HORSEPOWER

| Displacement: | 61.0 cubic inches (1000 cc) |
|---|---|
| Number of Cylinders: | 4 |
| Speed: | 8000 RPM |

TABLE XI-continued

HORSEPOWER

Fuel: Gasoline

HP = (MEP) (Vd) (n)/(33,000 × 12)
MEP = Corrected Mean Effective Pressure
Vd = Total Displacement/no. of cylinders
   = 61.0 cu. in./4 = 15.25 cu. in.
n = number of cylinders × RPM
   = 4 × 8000 = 32,000 = power inputs per minute

| CONVENTIONAL | HYPER-EXPANSION |
|---|---|
| HP = (175)(15.25)(32,000)/((33,000)(12)) | HP = (248.5)(15.25)(32,000)/((33,000)(12)) |
| HP = 215.7 | HP = 306.2 |

TABLE XII

INDICATED SPECIFIC FUEL CONSUMPTION

ISFC = 2545/(Ec × Nc) = lb of fuel per HP-hr
Ec = Chemical Energy per lb of fuel = 19,000 Btu
Nc = Corrected Thermal Efficiency (TABLE IX)

| CONVENTIONAL | HYPER-EXPANSION |
|---|---|
| ISFC = 2545/(19,000 × 0.27) | ISFC = 2545/(19,000 × 0.39) |
| ISFC = 0.50 lb of fuel/HP-hr | ISFC = 0.34 lb of fuel/HP-hr |

TABLE XIII

MILES PER GALLON

Assume an imaginary vehicle is going to travel 60 miles per hour for one hour and due to rolling resistance and air resistance requires 20 horsepower to travel at that velocity.
Lbs. of fuel required = (ISFC)(HP)(hrs)
Pounds per gallon of fuel = 6.0 lbs (Gasoline)
Gallons of Fuel = Lbs of fuel required/Lbs. per gallon
MPG = Distance Traveled / Gallons of Fuel

| CONVENTIONAL | HYPER-EXPANSION |
|---|---|
| Lbs. of Fuel = (0.50)(20)(1) = 10.0 lbs. | Lbs. of Fuel = (0.34)(20)(1) = 6.8 lbs. |
| Gallons of Fuel = 10/6 = 1.67 | Gallons of Fuel = 6.8/6 = 1.13 |
| MPG = 60 mi./1.67 gal = 36 MPG | MPG = 60 mi./1.13 gal = 52.94 MPG |

Based upon this scenario, and strictly from a thermodynamic viewpoint, the Hyper-Expansion Engine represents a 32 percent reduction in fuel consumption.

Figure 10:
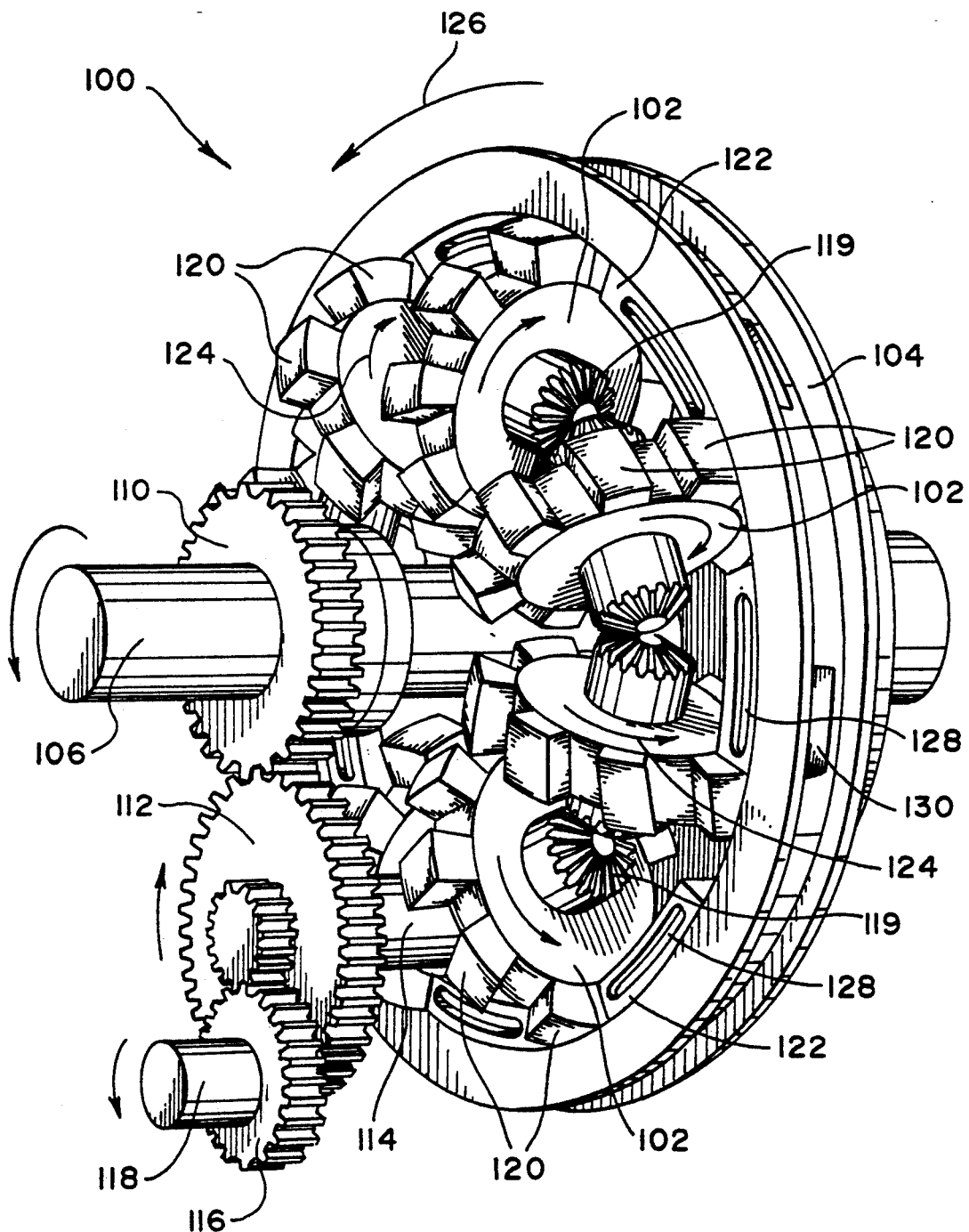
FIG. 10 is a perspective view of another embodiment of an engine in accordance with the invention.

FIGS. 10–13 show another form of an engine 100 of the invention. FIG. 10 shows the principal mechanical components of the engine 100. Eight compressor rotors 102 interact with one expansion rotor 104. Attached to the expansion rotor 104 is a main shaft 106 which is provided with bearings 162 (FIG. 11) and a gear 110 engaging gear 112 of compressor drive shaft 114. Gear 112 engages gear 116, which in turn drives an oil pump drive shaft 118. The compressor rotors are connected together by means of gears 119. Each of the compressor rotors 102 has a plurality of secondary vanes 120. The expansion rotor 104 has a plurality of primary vanes 122 around its inside, which intermesh with the vanes 120 as the rotors 102 and 104 rotate in the directions indicated by the arrows 124 and 126, respectively. Each of the vanes 122 has a transfer passage 128, the function of which is identical to transfer passage 62 (FIGS. 7 and 8) of engine 10, terminating in an exhaust port 130.

Figure 11:
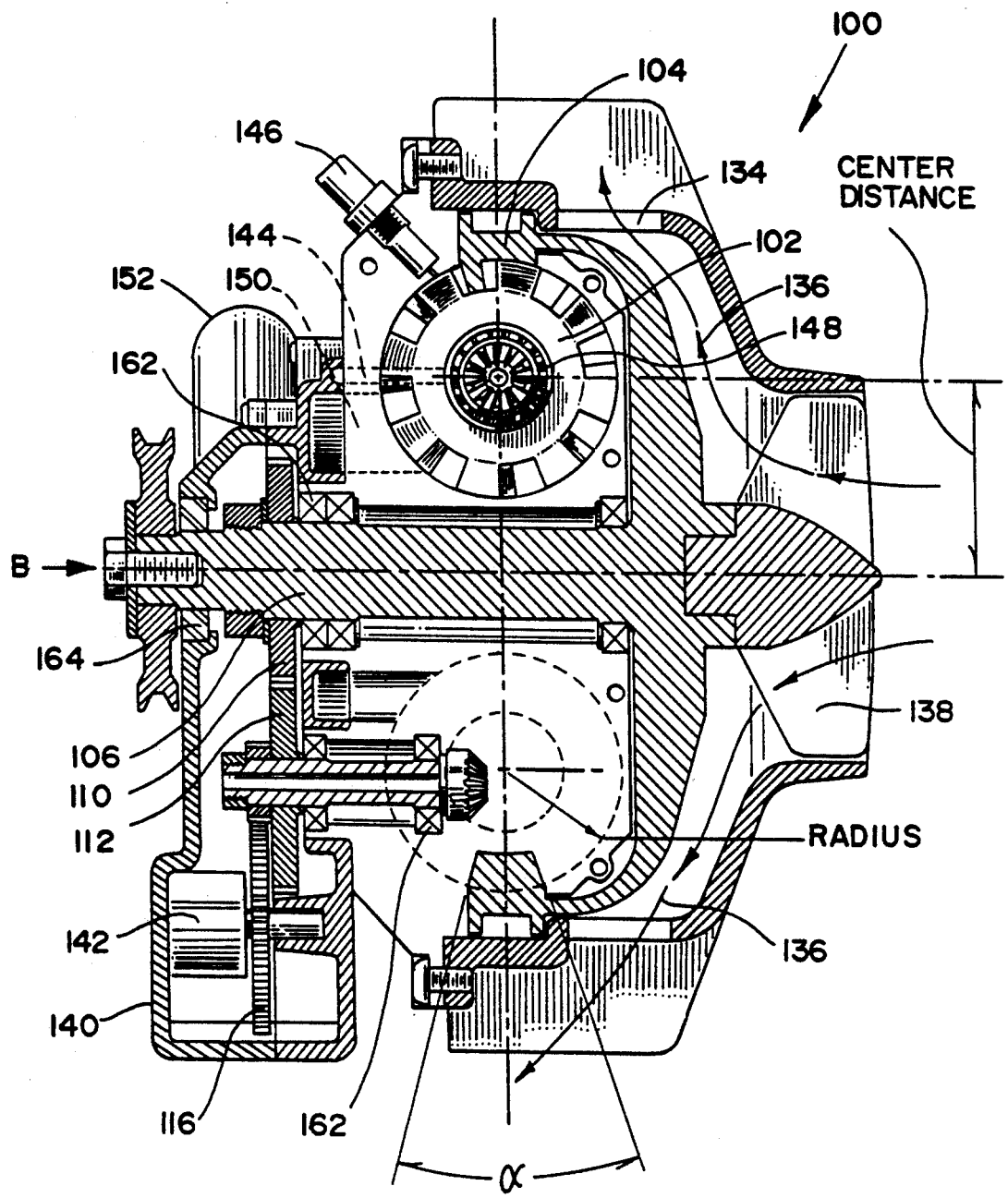
FIG. 11 is a cross-sectional view of the engine in FIG. 10, taken along the line A—A of FIG. 12.
Figure 12:
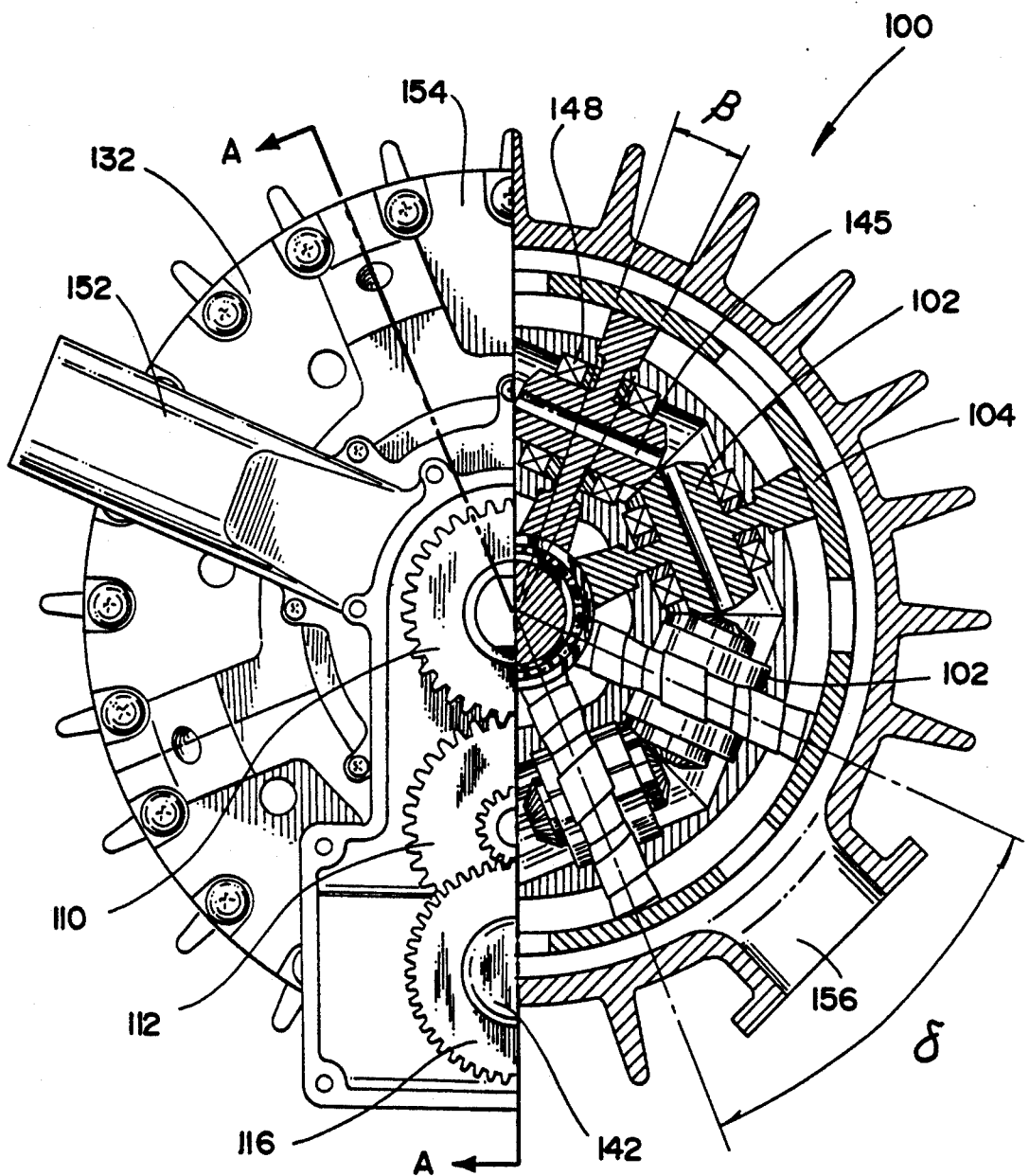
FIG. 12 is a partial cross-sectional view and elevation of the engine in FIGS. 10 and 11, looking in the direction of B (along the main shaft) in FIG. 11.
Figure 13:
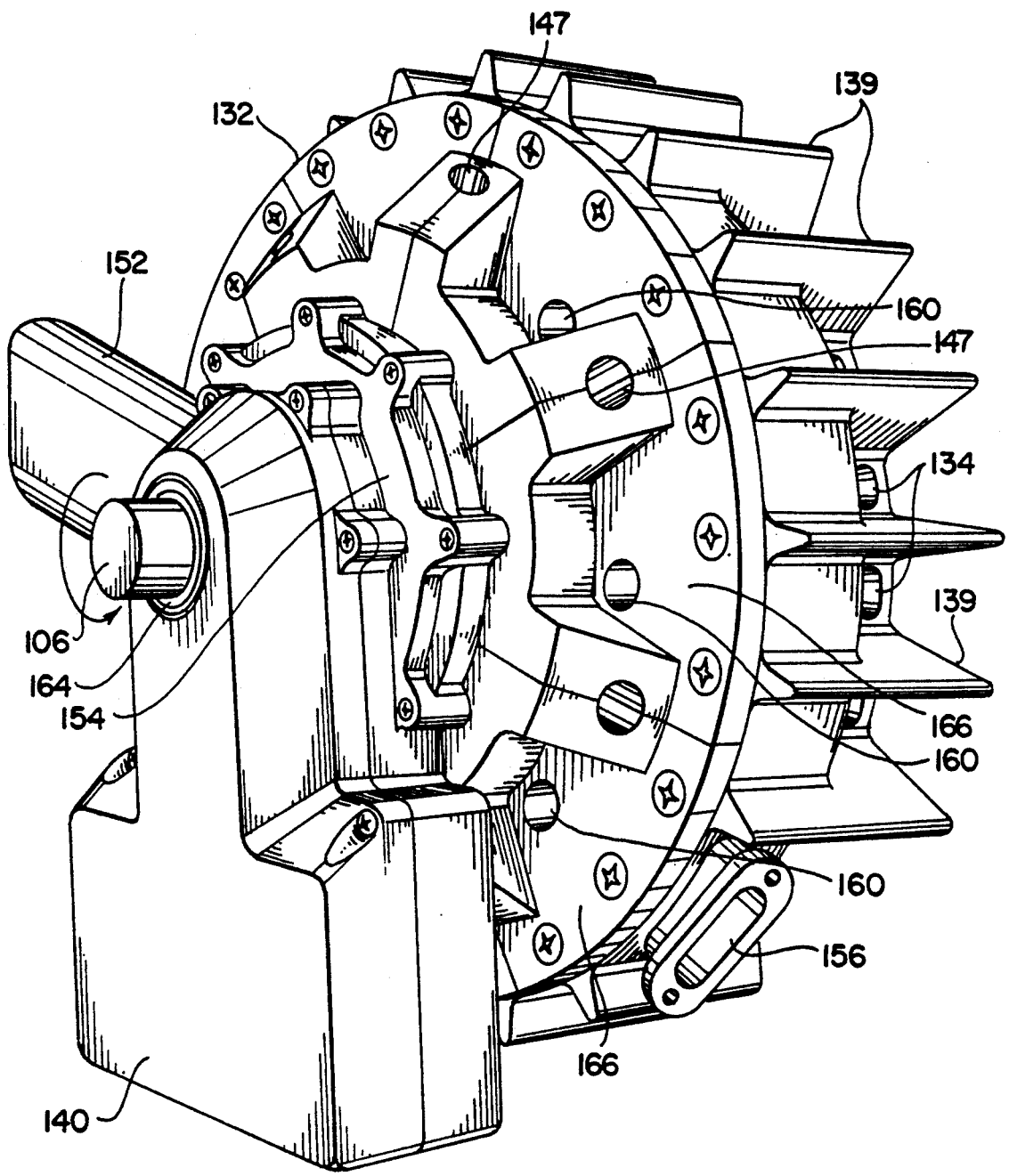
FIG. 13 is a perspective view of the assembled engine in FIGS. 10-12, showing outer components and enclosures of the proposed engine.
Figure 14:
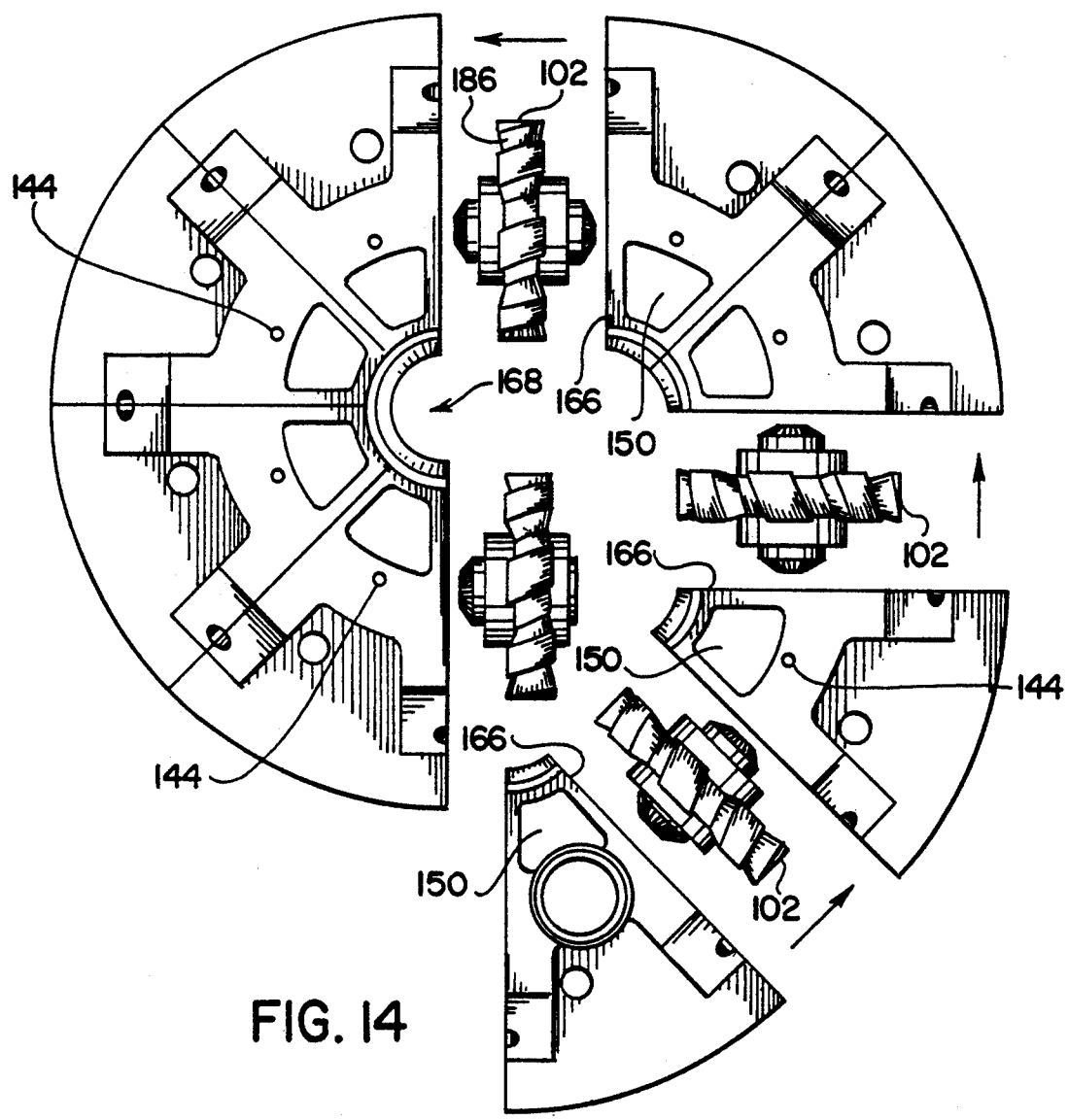
FIG. 14 is an elevation view and representation of the assembly sequence for assembling the block sectors of the engine in FIGS. 10-13.

FIGS. 11–13 show additional details of the engine 100. These views show the engine 100 assembly in elevation and partial cross-section and in external perspective. The portion of the engine 100 shown in FIG. 10 is enclosed in a block 132, which interacts with the rotors 102 and the rotor 104 as they rotate to form working chambers dynamically, which roughly correspond to cylinders in a conventional piston engine. The block 132 has a cooling duct 134, through which air 136, driven by cooling fan 138 attached to the main drive shaft 106, passes to cool the engine 100. Cooling fins 139 on the block 132 assist in the cooling. A gear housing and oil sump 140 is attached to the block 132 to enclose gears 110, 112 and 116 and oil pump 142. The oil pump 142 is connected to lubrication channels 144 (see also FIGS. 14 and 15) throughout the block 132 to supply oil to the moving parts of the engine. The first rotors 102 include oil return passages 145 to facilitate return of the oil to the oil sump 140. A fuel injector 146 is provided for each of the rotors 102 at locations 147 on the block 132. The rotors 102 are supported in bearings 148. An intake port 150 is provided for each of the rotors 102. An intake duct 152 on the block 132 provides air to the intake ports 150 through intake manifold 154. An exhaust port 156 through the block 132 receives exhaust gases from exhaust ports 130 in the vanes 122. Ignition devices 158 (see FIGS. 20-24) are provided between each of the first rotors 102 and the second rotor 104 at location 160. The main drive shaft 106 is supported by bearings 162 and has an oil seal 164 where it passes through block 132. FIGS. 13 and 14 show details of the block 132 and its method of assembly. The block 132 is formed from a plurality of wedge-shaped sectors 166. Two block sectors 166 are joined together to encapsulate a compressor rotor 102. The sectors 166 are joined together in such a sequence so as to result in semi-circular assemblies 168. These two assemblies 168 are then joined together along with the remaining two compressor rotors 102 to form the engine block 132. Also shown in FIG. 14 are intake ports 150 on the sectors 166.

Figure 15:
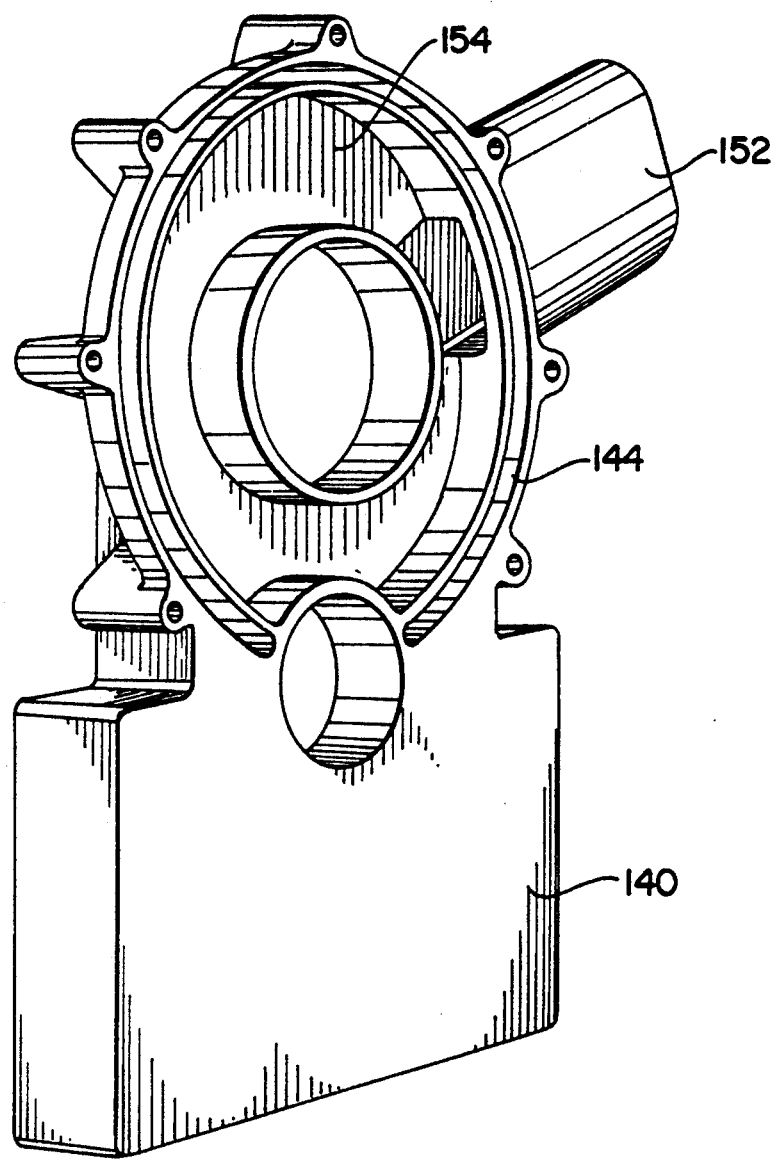
FIG. 15 is a perspective view of the rear of a portion of the engine in FIGS. 10-14.

FIG. 15 shows details of the intake manifold 154 and oil sump 140 with oil distribution channel 144 and intake duct 152.

Figure 16:
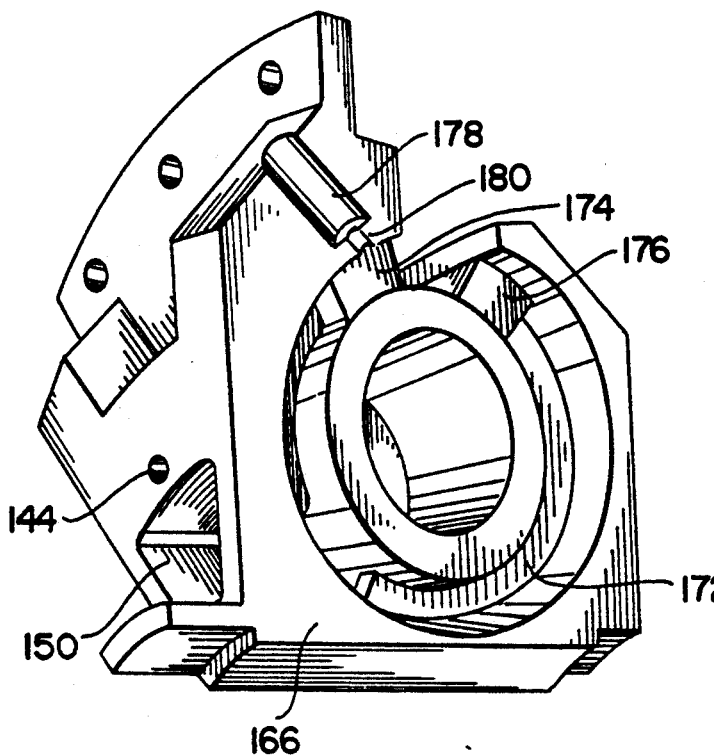
FIG. 16 is a perspective view of a block sector for the engine of FIGS. 10-15.
Figure 17:
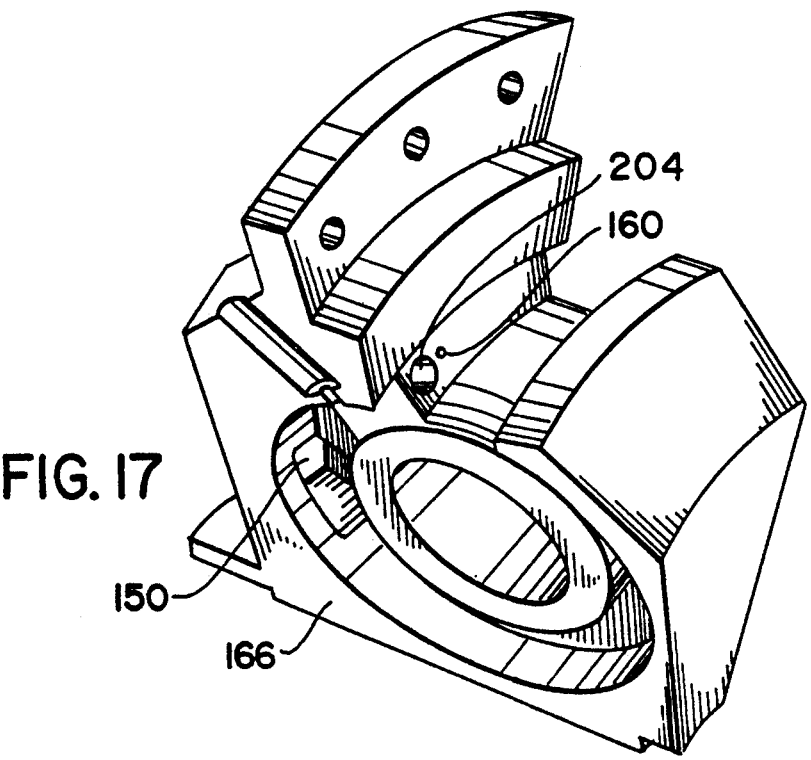
FIG. 17 is another perspective view of the block sector in FIG. 16.

FIGS. 16 and 17 give further details of the sectors 166, showing an intake port 150, intake passageway 172 connected to the intake port 150, compression phase and expansion phase sealing areas 174 and 176, fuel injector 146 location 178 and orifice 180 and lubrication channel 144. Also shown are the location of combustion chamber 204 and location 160 of ignition device 158.

Figure 18:
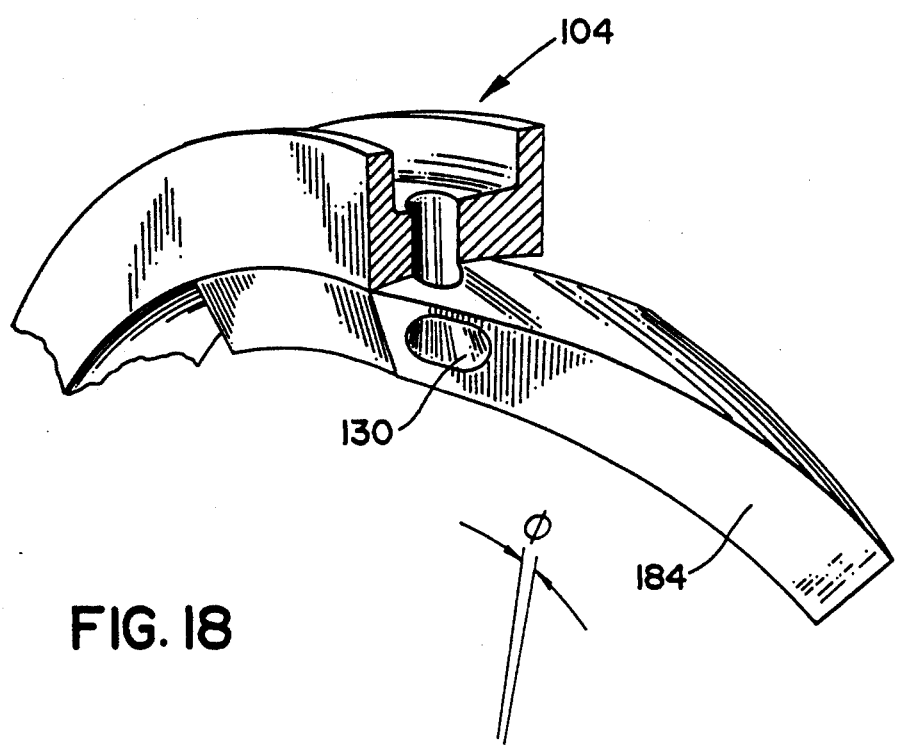
FIG. 18 is a perspective view of the primary vane for the engine of FIGS. 10-15.
Figure 19:
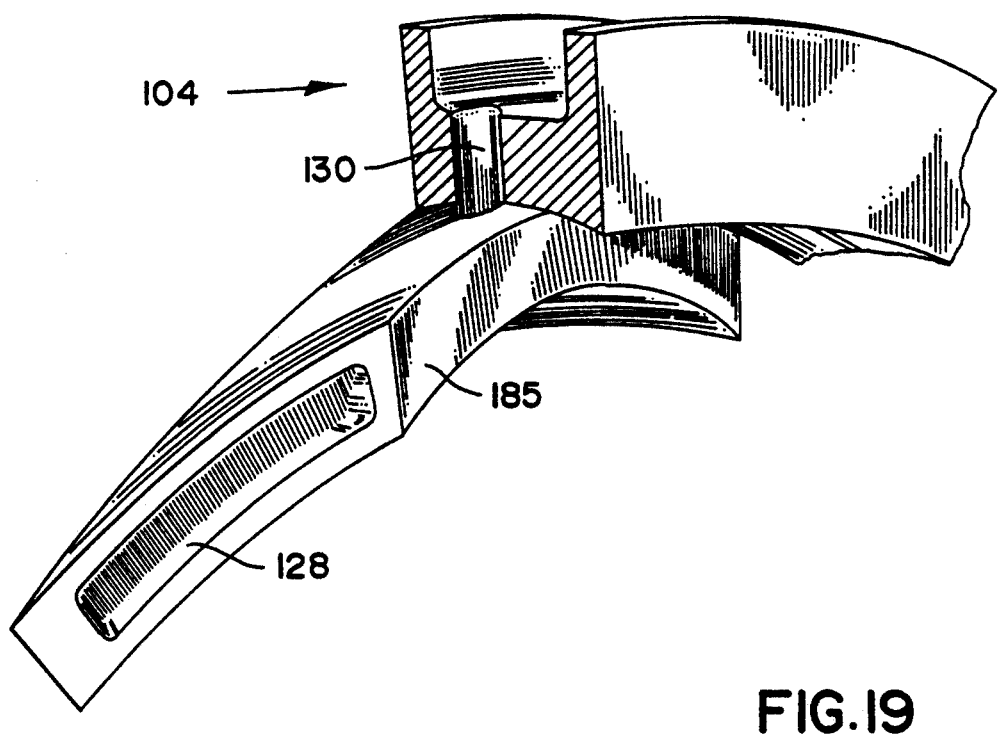
FIG. 19 is another perspective view of the primary vane in FIG. 18.

FIGS. 18 and 19 give further details of the expansion rotor 104, showing exhaust port 130 and meshing surfaces 184 and 185, which engage surfaces 186 (FIG. 14) of the compressor rotors 102 in operation of the engine 100. Also shown is transfer passage 128.

Like the toroidal hyper-expansion rotary engine 10 of FIGS. 1-9, the multi-compressor hyper-expansion engine 100 of FIGS. 10-19 is also a positive displacement engine which consists of two or more rotors 102 and 104 oriented to provide sufficient changes in volume to allow a cyclic pumping action to take place which enables the intake, compression, hyper-expansion and exhaust of a working fluid. By the addition of heat into the cycle, the engine is able to produce work. As FIGS. 5-8 describe the sequence of events for the pumping action of the toroidal hyper-expansion engine 10, FIGS. 20-24 show the similarities of the pumping action of the multi-compressor hyper-expansion engine 100. One difference between the two actions is that the exhaust phase of the multi-compressor hyper-expansion engine 100 uses exhaust ports 130 within the primary vanes 122 whereas the toroidal hyper-expansion rotary engine does not.

It should be pointed out that both engines are toroidal hyper-expansion rotary engines and operate on the same concepts; however, the differences between the two are in the mechanical arrangements of their rotors. The toroidal hyper-expansion engine 10 has its rotors 12 and 14 linked like the links of a chain. The multi-compressor hyper-expansion engine 100 does not require a linking together of its rotors 102 and 104. Whereas the rotors 12 and 14 of the toroidal hyper-expansion engine each provide for the attachment of secondary vanes 18 and primary vanes 22, the rotors 102 and 104 of the multi-compressor hyper-expansion engine 100 each have only one type of vane.

The outer peripheral surfaces of rotors 12 and 14 and primary vanes 22 of engine 10 are transversely convex in shape and the inner peripheral surface of rotors 12 and 14 and secondary vanes 18 are transversely concave. The inner peripheral surface of rotor 104 and primary vanes 122 of engine 100 are transversely concave and the outer peripheral surfaces of rotors 102 and secondary vanes 120 are transversely convex.

The rotors 102 of the multi-compressor hyper-expansion engine which have secondary vanes 120 are called the compressors 102. The one rotor 104 of the multi-compressor hyper-expansion engine 100 with primary vanes 122 is called the expansion rotor 104. The expansion ratio remains the same at 3.5:1; therefore, the same thermodynamic relationships and efficiencies exist as in the toroidal hyper-expansion engine and as illustrated by TABLES I-XIII.

The multi-compressor hyper-expansion engine 100 is a positive displacement internal combustion engine whose pumping action is achieved through concentric rotary motion of its moving parts and which allows the expansion volume of the heated air to be greater than the original intake volume, thus providing many benefits, including increased thermal efficiency. The overall design of the engine 100 is very flexible, therefore allowing for the addition of other features deemed necessary to improve its operation or reliability. The current expansion volume is three and one-half times as great as the intake volume, but this expansion volume can be made greater or lesser depending on the design requirements. By allowing the heated air to expand into a large volume, the final temperature and pressure at the end of the cycle can be substantially lowered. The number of moving parts required for the engine 100 (disregarding ancillaries) to achieve its pumping action and power output is ten. Of these, six are identical, with the seventh and eighth parts almost identical except for minor details. This is a noteworthy feature as far as the manufacture of the engine.

The exhaust temperatures are approximately nine-hundred degrees Fahrenheit lower than those of typical positive displacement engines. This shows that a greater proportion of the heat energy available is actually being utilized to provide mechanical work. This leaves much less heat energy available to heat up engine components, so it is anticipated that the proposed engine will require a minimal cooling system. Air cooling is the cheapest and simplest, but water cooling is typically more stable. Either can be incorporated into the engine's design. Reduced exhaust temperature is also directly related to reduced exhaust pressure This aspect, combined with few moving parts, all of which are rotary, give a very quiet operating engine, thus muffling and sound deadening requirements can also be reduced with a corresponding savings in weight.

The moving parts of the engine 100 consist of one expansion rotor 104, eight compressors 102 and one compressor drive shaft 114 as shown in FIG. 10. The expansion rotor 104 is supplied with a main shaft 106 supported in rolling element bearings 162, although, depending on required operational speeds, plain bearings could be used as well. The compressors 102 are independent rotors which are geared together by gears 119 and which are also supported via shafts and rolling element or plain bearings 148. The compressor drive shaft 114 is geared directly to the main shaft 106 of the expansion rotor 104 with a gear ratio of 1:1 and is supported by rolling element or plain bearings 162 as well. The gear ratio need not be confined to 1:1; however, the gear ratio does impact the geometry of the compressors 102 and primary vanes 122 with a direct effect upon the efficiency and power output of the engine 100. The other end of the compressor drive shaft 114 is geared to one of the compressors 102 which are in turn geared together. The compressor drive shaft 114, of which more than one may be utilized, is also used to drive an oil pump 142 which can supply pressurized lubricant to all of the gears and bearings of the engine unit. The main drive shaft 106 mates with an appropriate transmission or coupling device and is provided with an accessory drive pulley if needed.

The expansion rotor 104 and the compressors 102 carry eight vanes 122 and 120 each. It is the interaction of the vanes 120 of the compressors 102 with the vanes 122 of the expansion rotor 104 which create the necessary changes in volume required for there to be a pumping action. The compressors 102 are arranged such that their spin axes are in an orthogonal plane to that of the spin axis of the expansion rotor. The compressors 102 are also radially oriented about the spin axis of the expansion rotor 104, so that each expansion vane 122 interacts with one compression vane 120 of each compressor 102 as the rotors 102 and 104 rotate through one complete revolution. The number of individual cycles completed for each revolution of the engine 100 is equal to the number of primary vanes 122 times the number of compressors 102. In this case, eight primary vanes 122 times eight compressors 102 equals sixty-four completed thermodynamic cycles per revolution of the expansion rotor 104. The engine 100 can be designed with any number of compressors 102 within the geometric limits imposed by the expansion rotor 104. It is possible to vary the displacement of the engine 100 either by changing the dimensions of the compressors 102 or by changing the number of compressors utilized. The number of secondary vanes 120 per compressor 102 must be equal to (1/ GEAR RATIO) * (the number of primary vanes 122 used on the expansion rotor 104) where:

GEAR RATIO = revolutions of a compressor 102 per revolution of the expansion rotor 104.

The stages of the thermodynamic cycle in the engine 100 are: Intake, Compression, Hyper-Expansion, Exhaust. Like positive displacement pumps, the pumping action is achieved through volumetric changes and occurs sequentially, but, at different locations. This arrangement provides for increased design flexibility for optimizing each phase of the cycle.

The four phases of the thermodynamic cycle are accomplished by a pumping action produced by the interaction of the secondary vanes 120 and chambers of the compressors 102 with the primary vanes 122 and chambers of the expansion rotor 104. The necessary pumping action is described as follows, with reference to FIGS. 20-24:

INTAKE

Figure 20:
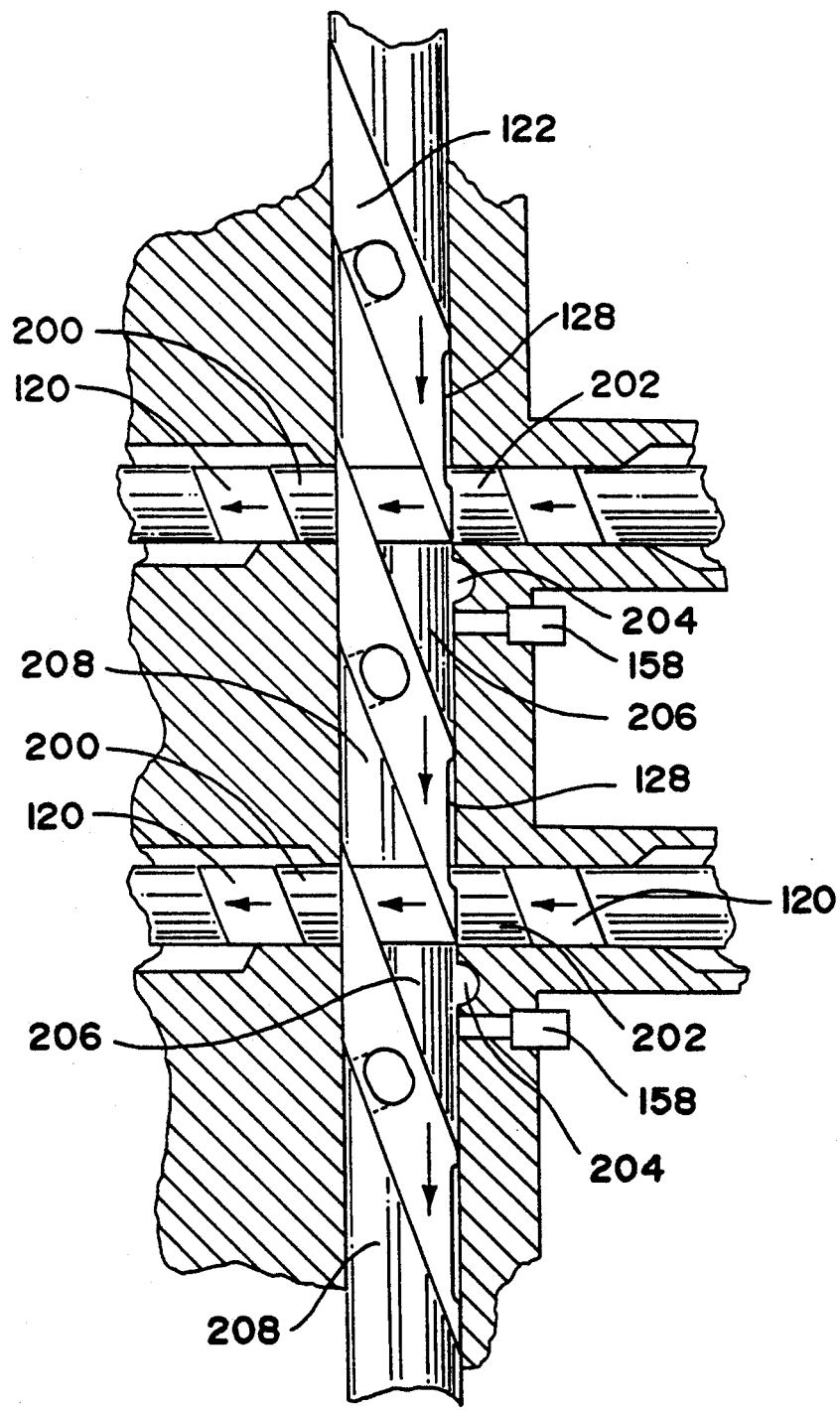
Figure 24:
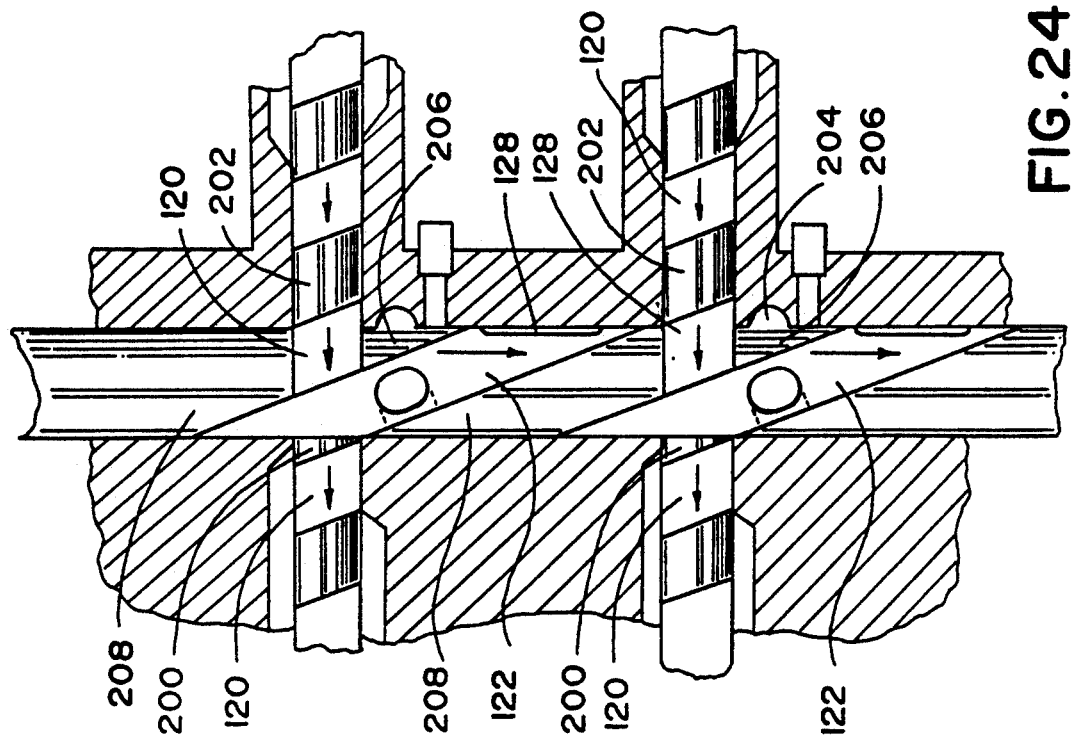

FIG. 24 shows the beginning of the formation of an intake chamber 200 as a secondary vane 120 moves away from a primary vane 122. The volume of the intake chamber 200 increases as shown by FIG. 20 until it reaches its maximum value in FIG. 21.

COMPRESSION

FIG. 24 shows a compression chamber 202 just at the beginning point of compression. The compression volume is reduced by the movement of a secondary vane 120 towards a primary vane 122. The reduction in volume is shown by FIGS. 20, 21 and 22. The contents of the compression chamber are compressed into the combustion chamber via the transfer passage 128 located on the side of the primary vanes 122. As shown by FIG. 22, the transfer passage 128 also unmasks the ignition device 158. The transfer passage 128 is in direct communication with combustion chamber 204 (See FIG. 21) so that the compressed mixture, which has been ignited by the ignition device 158 within the transfer passage 128, continues the burning of the compressed mixture within the combustion chamber 204.

HYPER-EXPANSION

Figure 23:
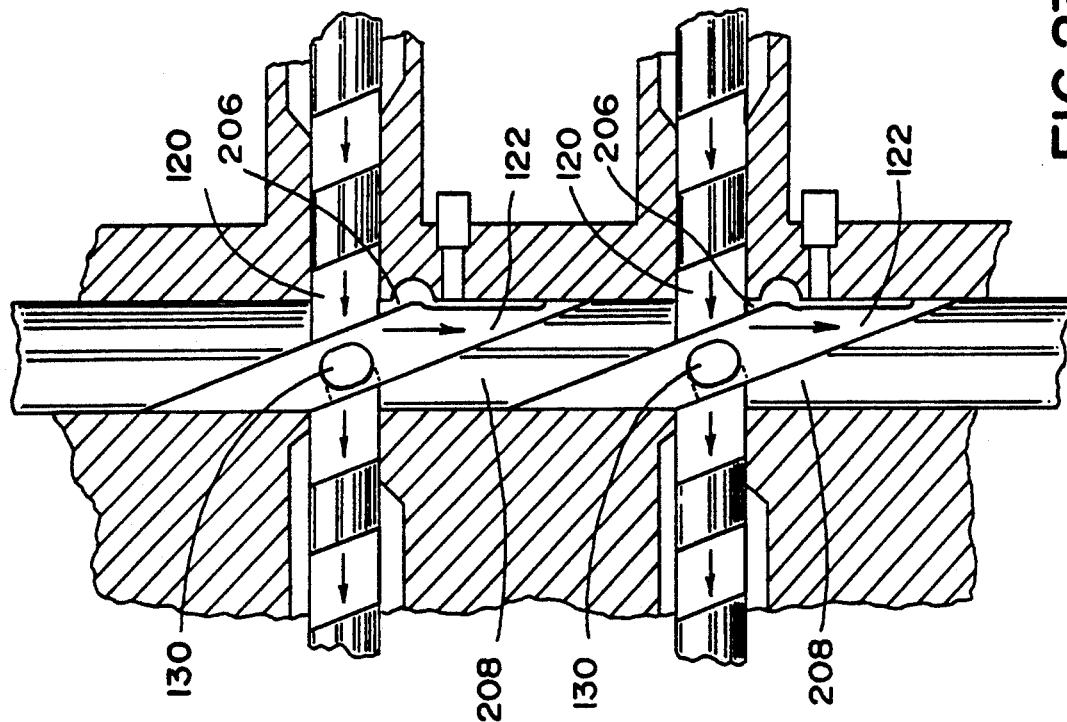

FIG. 23 shows the formation of an expansion chamber 206 as a primary vane 122 moves away from a secondary vane 120. The expansion chamber 206 continues to grow through FIGS. 24, 20, 21 and 22, respectively. This is the area where the burning gases exert a force upon the expansion vane 122 and drive the expansion rotor 104 around.

EXHAUST

FIG. 23 also shows the initiation of the exhaust phase. The exhaust gases are allowed to escape through the exhaust port 130 of the primary vane 122 as the port 130 becomes exposed and as the volume of exhaust chamber 208 is reduced by the movement of the primary vane 122 toward the secondary vane 120 as shown by FIGS. 24, 20, 21 and 22, respectively.

Figure 25:
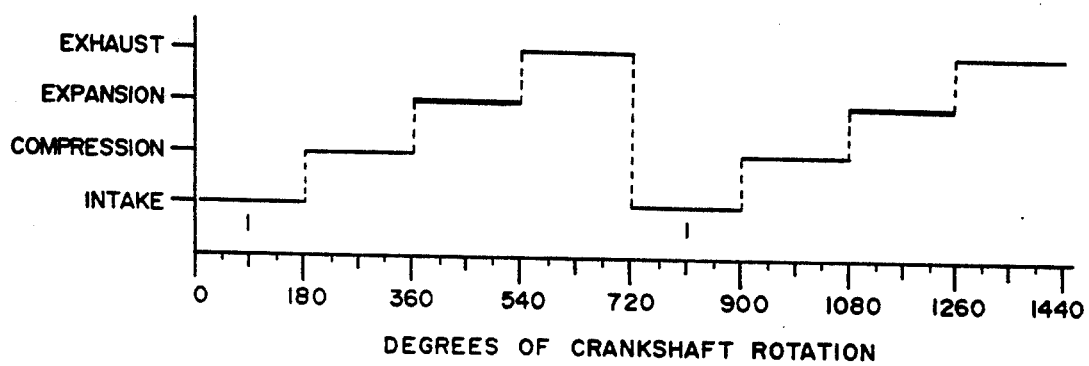
FIGS. 25-32 show prior art engine cycle diagrams and cycle diagrams for the engine of this invention.

FIGS. 25 through 32 show a comparison of the respective cycles for common prior art engines with the present engines 10 and 100. It is the expansion phase of the cycles of all of the engines which is responsible for performing work upon the engine. FIG. 25 maps the phases of the cycle of a single cylinder four-stroke reciprocating engine. It shows that for every 720 degrees of crankshaft rotation (two full revolutions) there is only one expansion phase. If we add another cylinder to the engine then, regardless of how the movements of the pistons are phased with respect to one another, there will be two expansion phases for every 720 degrees of crankshaft rotation. FIG. 26 shows that a four cylinder, four-stroke reciprocating engine can provide up to four expansion phases per 720 degrees of crankshaft rotation. The smoothest power output will be when the cycles are 180 degrees out of phase with respect to each other. This would produce an expansion phase for every 180 degrees of crankshaft rotation.

Figure 27:
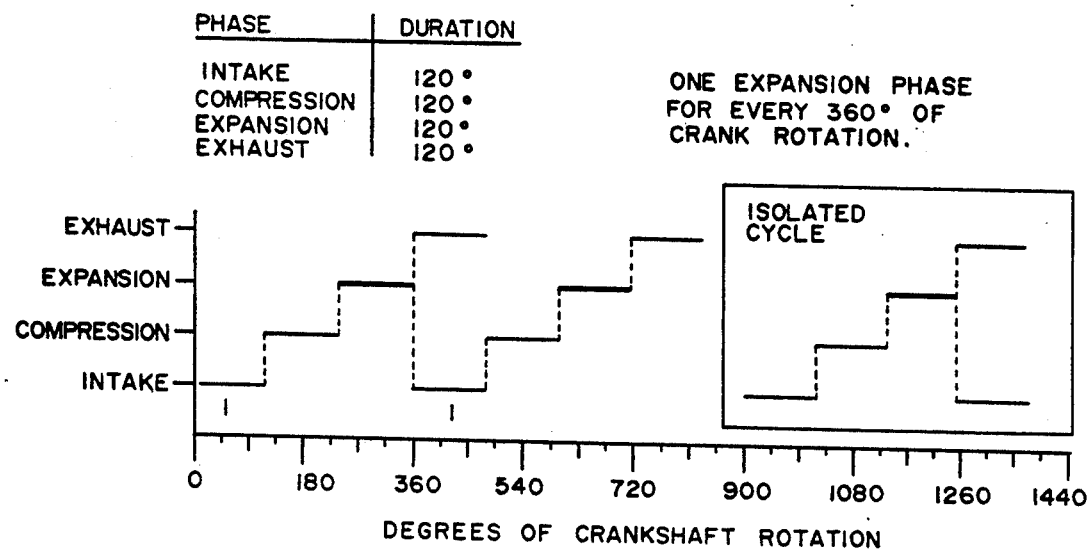

FIG. 27 maps the cycle of a single cylinder two-stroke reciprocating engine. It shows there to be an overlapping of the phases with an expansion phase every 360 degrees of crankshaft rotation. With the addition of a second cylinder, the two stroke engine is capable of producing an expansion phase every 180 degrees of crank rotation; the same as a four cylinder, four-stroke reciprocating engine. This is possible because the total amount of duration for a two-stroke engine to complete one cycle is 360 degrees as opposed to 720 degrees for the four-stroke. The two-stroke engine accomplishes this by overlapping the phases of its cycle. This is why two-stroke engines commonly have higher power densities than four-stroke engines of comparable design.

Figure 28:
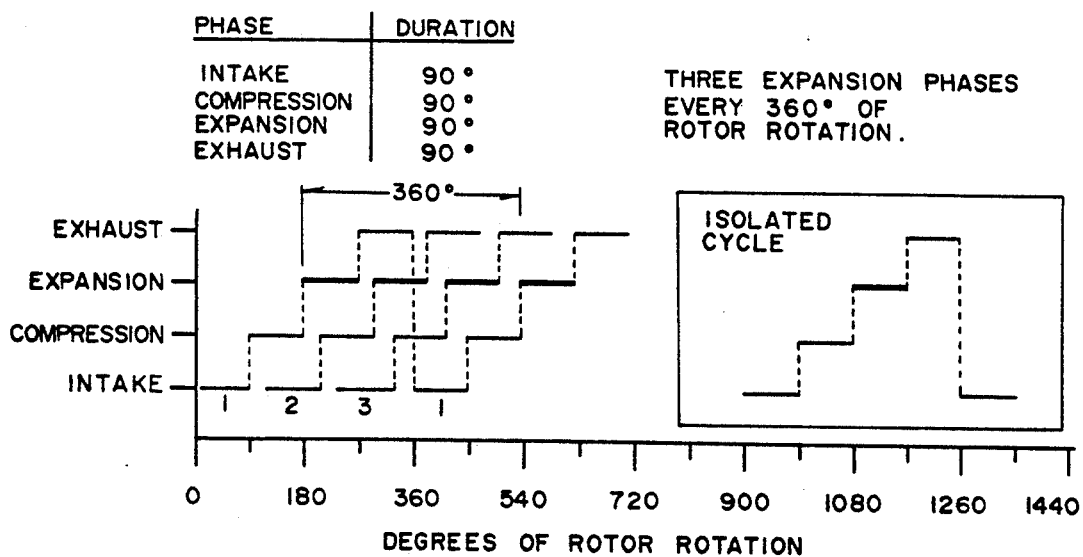
Figure 29:
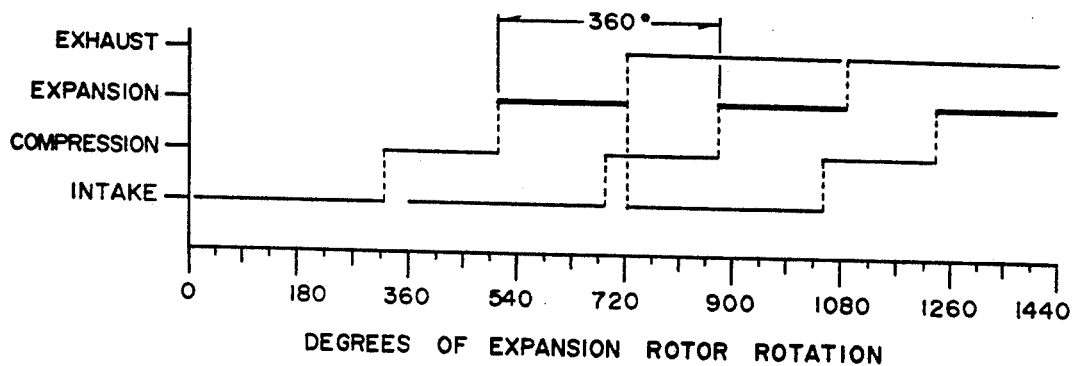
Figure 30:
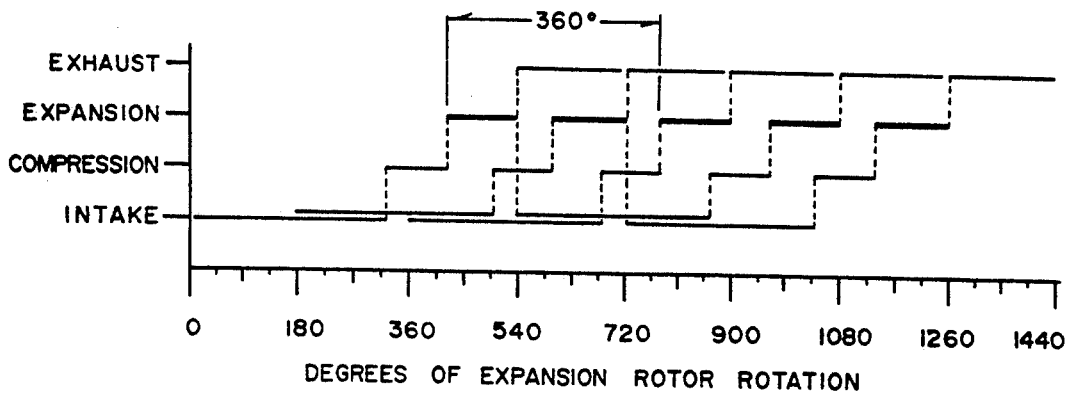
Figure 31:
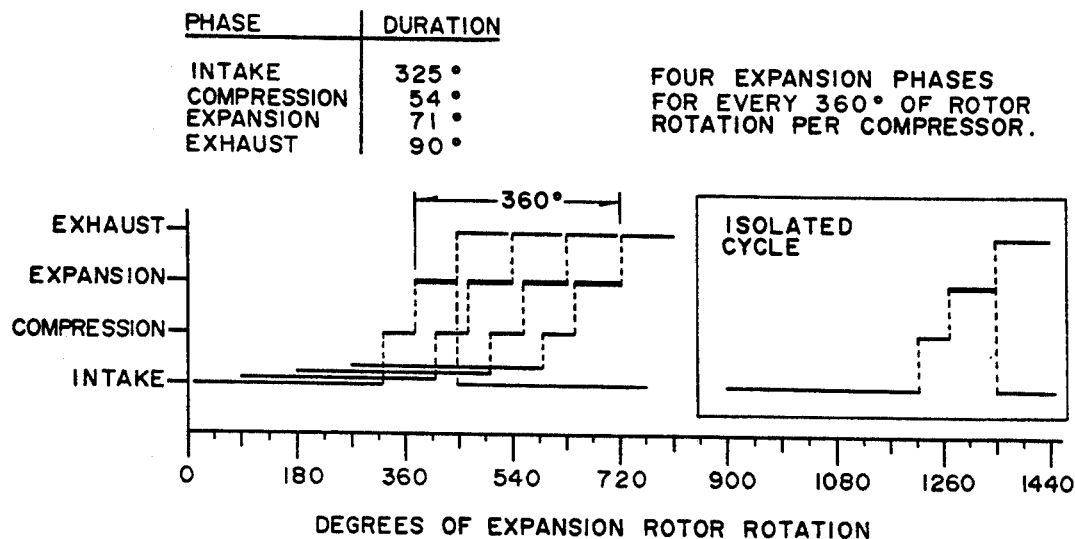
Figure 32:
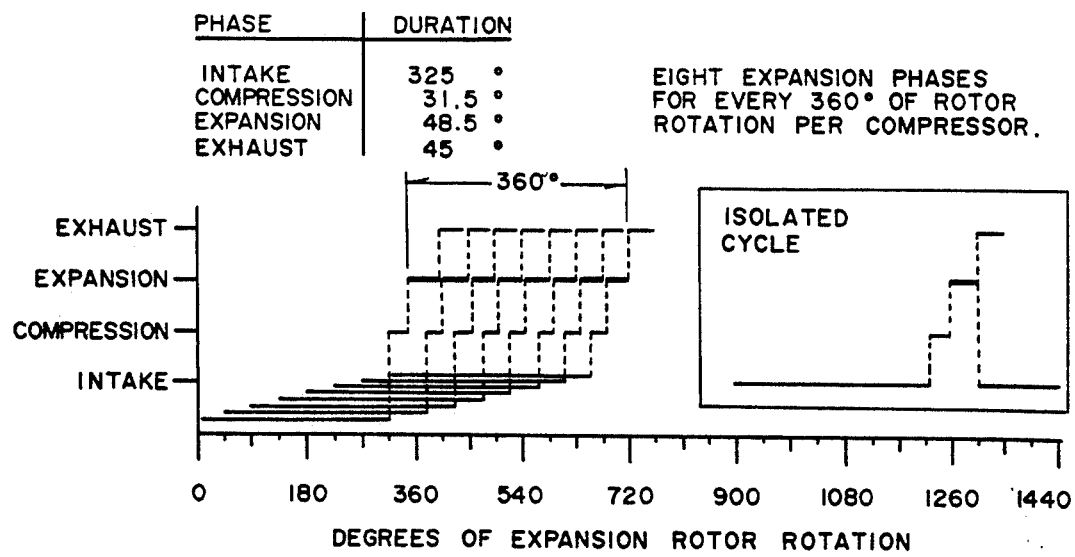

The cycle of the Wankel engine is shown in FIG. 28. A single rotor Wankel engine produces three expansion phases for every 360 degrees of its rotor's rotation. In order to fairly represent the cycle of the Wankel engine it was necessary to show its cycle times with respect to the rotation of its rotor rather than the rotation of its output shaft. This eliminates the effects of the gear ratios required between the output shaft and the rotor itself.

Although, in actual practice, the durations of the phases of each of the above cycles varies, each phase of the three respective cycles was depicted as consuming equal duration. In other words, the intake, compression, expansion and exhaust phases required 180 degrees each for the four-stroke engine, 120 degrees each for the two-stroke engine and 90 degrees each for the Wankel engine.

The cycle of the proposed engine is much akin to the cycle of the two-stroke reciprocating engine except that the duration of each of the phases is not equal, and the possible extent of variation in duration is substantially larger. FIGS. 29 through 32 illustrate the cycles for single compressor, two compressor, four compressor and eight compressor hyper-expansion engines respectively. By comparing the isolated cycle of FIG. 27 with the isolated cycles of FIGS. 31 and 32, it can be seen how the cycle of the proposed engine is much like that of the two-stroke reciprocating engine; however, it is also plainly evident that the proportionality of the durations of the phases of the proposed engine as well as the total duration required per complete cycle are significantly different from those of any of the above mentioned engines.

The approximate durations for each of the phases of the cycle of the hyper-expansion engine 100 are with respect to degrees of expansion rotor 104 rotation and can be calculated as follows:

INTAKE DURATION (degrees) = $(360 - \alpha)$/GEAR RATIO.
COMPRESSION DURATION (degrees) =
$(\gamma + \beta)$/GEAR RATIO.
EXPANSION DURATION (degrees) = $(\alpha - \beta + \theta)$.
EXHAUST DURATION (degrees) = $\delta$.

where:

$\alpha$ = The included angle of the end of an expansion vane as measured from the axis of rotation of a compressor (FIG. 11).

$\beta$ = The included angle of the end of a compression vane as measured from the axis of rotation of expansion rotor (FIG. 12).

Figure 34:
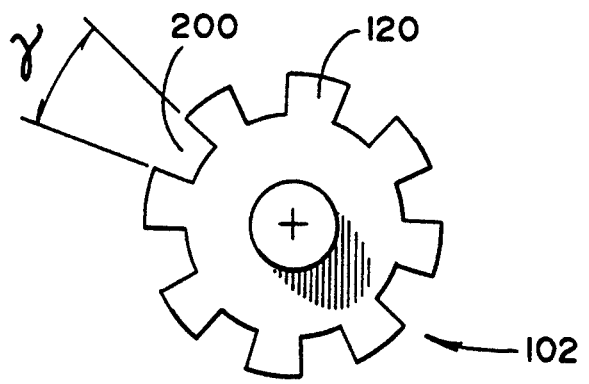
FIG. 34 is a simplified elevation of another portion of the engine in FIGS. 10-15.
Figure 35A:
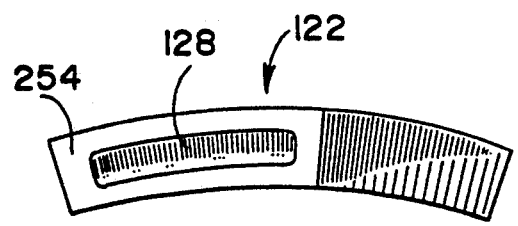
FIGS. 35A-35B and FIGS. 36A-36B are corresponding side and end views of the primary vane for the engine of FIGS. 10-15 and of a primary vane of a further embodiment of an engine in accordance with the invention.
Figure 35B:
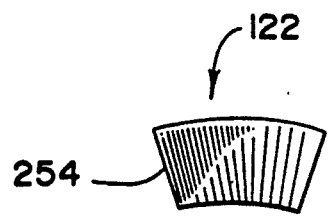
Figure 36A:
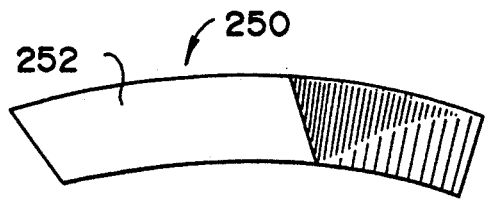
Figure 36B:
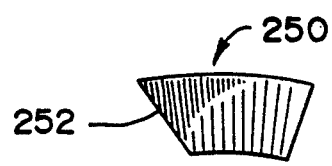
Figure 37A:
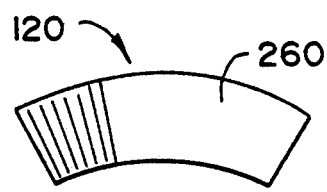
FIGS. 37A-37B and FIGS. 38A-38B are corresponding side and end views of the secondary vane for the engine of FIGS. 10-15 and of a secondary vane of the further embodiment of an engine in accordance with the invention.
Figure 37B:
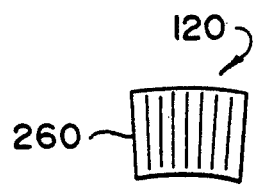
Figure 38A:
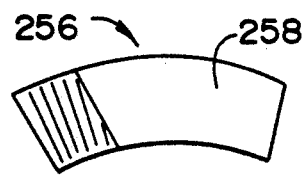
Figure 38B:
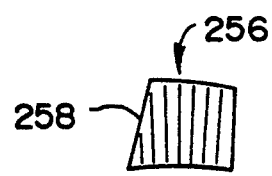

$\gamma$ = The included angle of the side of an intake chamber as measured from the axis of rotation of a compressor (FIG. 34).

Figure 33:
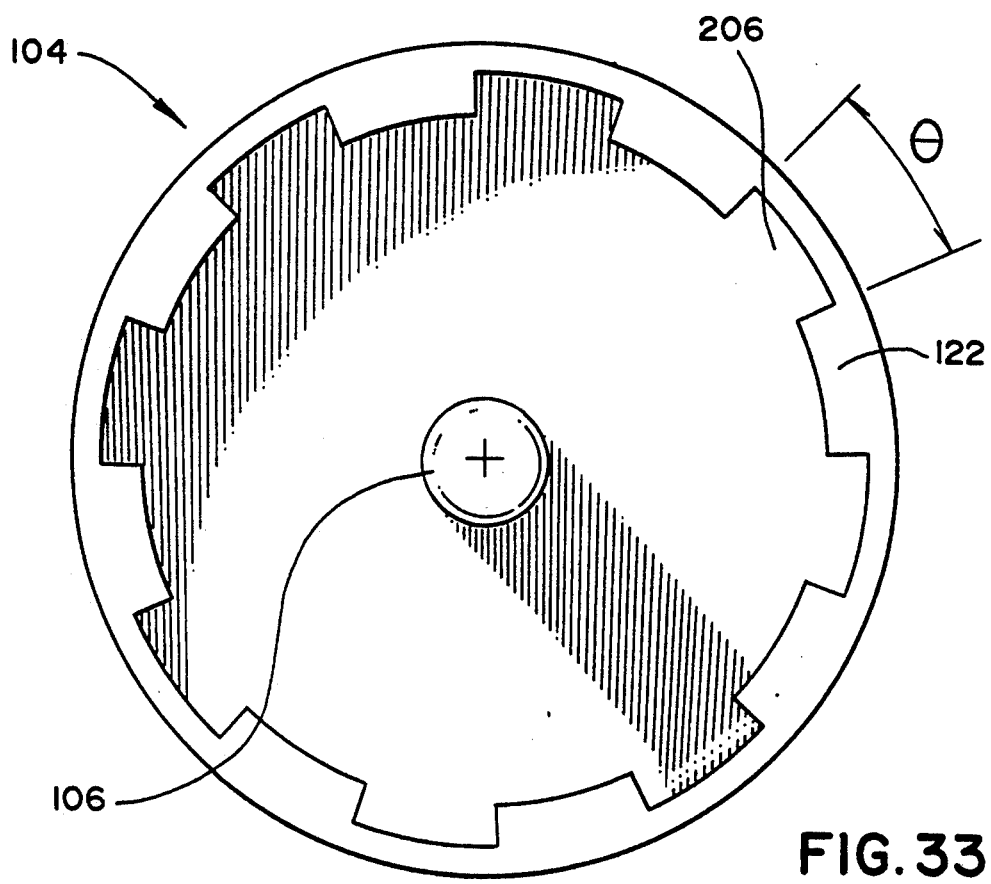
FIG. 33 shows a simplified elevation view of a portion of the engine of FIGS. 10-15, looking along direction B of FIG. 11.

$\theta$ = The included angle of the side of an expansion chamber as measured from the axis of rotation of the expansion rotor (FIG. 33).

$\delta$ = The included angle of the radial orientation of the compressors as measured from the axis of rotation of the expansion rotor (FIG. 12).

GEAR RATIO = The number of revolutions of a compressor per revolution of the expansion rotor.

The engine 100 is an eight compressor hyper-expansion engine with eight primary vanes 122 and a compressor 102 to expansion rotor 104 GEAR RATIO of 1:1 and has the following approximate values:

$\alpha$ = 35.0 degrees
$\beta$ = 9.0 degrees
$\gamma$ = 22.5 degrees
$\theta$ = 22.5 degrees
$\delta$ = 45.0 degrees This yields an intake duration of 325 degrees, a compression duration of 31.5 degrees, an expansion duration of 48.5 degrees and an exhaust duration of 45 degrees. The ratio of $\alpha$ to $\beta$ approximately represents the ratio of expansion volume to intake volume. In this case, the ratio is around 4 to 1, but the actual expansion ratio is 3.5 to 1 because the exhaust phase begins before the expansion volume has reached its maximum due to exhaust port 130 becoming unmasked. In this case, $\gamma$ and $\theta$ are equal but this is not required. In the current version of the proposed engine, the included angle of the intake chamber equals the included angle of the secondary vane measured from the axis of rotation of the compressor. The same is true for the expansion chamber and the primary vane. However, the only rigid requirement is that the sum of the included angles of a chamber plus a vane times the number of vanes must equal 360 degrees.

For example, by decreasing $\gamma$ from 22.5 degrees to 15 degrees increases the included angle of a secondary vane from 22.5 degrees to 30 degrees ($8*(22.5+22.5)=360=8*(15+30)$). This affects the proportions of the expansion chamber with the primary vane in the opposite way but with the same requirement, the sums of the included angle of an expansion chamber and the included angle of a primary vane times the number of primary vanes must equal 360 degrees; however, $\theta$ becomes 30 degrees and the included angle of the primary vane becomes 15 degrees. This is necessarily the case because, if the included angle of a secondary vane is increased, so must the included angle of the corresponding expansion chamber through which the vane must interact. A further ramification of these ratios is the ability to affect the displacement of the engine and the expansion ratio. All else remaining the same, if $\gamma$ is reduced and, accordingly, $\theta$ is increased, then the displacement of the compressor is reduced but the expansion ratio is increased. The converse holds true as well.

If the GEAR RATIO is altered so that the compressors spin with twice the angular velocity of the expansion rotor (GEAR RATIO=2:1) then the durations are modified according to the above equations, but more importantly, the efficiencies and power output are changed as well, because the doubling of the GEAR RATIO results in doubling the intake displacement of the engine 100. Using Tables I-XIII for the engine 10 as a thermodynamic comparison and keeping the original expansion volume the same, the displacement of the engine 100 becomes twice that of the original, from 61.0 cubic inches (TABLE XI) to 122.0 cubic inches. The expansion ratio is cut in half from 3.5:1 down to 1.75:1. By reintroducing these new values into the thermodynamic equations, the Corrected Thermal Efficiency is reduced from 0.39 to 0.33 and the Corrected Mean Effective Pressure is reduced from 248.5 psia to 210.0 psia. These reductions are due to the reduction in the expansion ratio; however, the Horsepower goes up from 306.2 at 8000 RPM of the expansion rotor 104 to 517.0 at the same speed. The power output is increased due to the increase in displacement. If the expansion ratio is increased to its former value, then the power output will jump to 612.4, twice the original output. It becomes evident that the GEAR RATIO can play an influential part in determining the characteristics of a multi-compressor hyper-expansion engine 100.

The intake process for the engine 100 is enhanced by a drastic increase in the intake duration. With the reciprocating engines, both two-stroke and four-stroke, and the Wankel engine, the intake process is hindered by short duration because all phases of the thermodynamic cycle occur at the same geometric location of the engine and with the same approximate duration. The engine 100 allows the intake and compression phases to take place in the compressor 102 and the expansion and exhaust phases to take place within the expansion rotor 104. The substantially different phase duration of the engine 100 are due to the separation of the geometric locations of each phase. The increased intake duration will have a very direct and positive influence on the volumetric efficiency of the proposed engine, which is a direct measure of an engine's potential for doing work.

The greatly shortened compression phase is beneficial as well, because the gas is heated by the process of compression even before the burning of the fuel. This heat is also part of the potential work of an engine. If the air is compressed slowly, the heat will escape to the remainder of the engine by the process of conduction and some of the overall potential of the engine will be lost. This heat loss can be minimized by speeding up the compression phase.

The hyper-expansion phase is also considerably shortened with the same benefits. There is a reduction in the amount of time heat can be absorbed by the engine 100. This, however, makes it very critical to have adequate turbulence within the fuel/air mixture during combustion, because there will be less time for the combustion to take place.

Like the compression and hyper-expansion phases, the shortened exhaust phase duration is also beneficial, because this reduces the amount of time that the exhaust gases have to give their remaining heat to the components of the engine 100. The exhaust gases can be collected in a separate area and processed, if required, to reduce pollutants. Unlike reciprocating engines, the exhaust gas is not used for scavenging. The engine 100 optimizes all of the necessary phases of the pumping and thermodynamic cycles.

The vanes 122 and 120 of the expansion rotor 104 and the compressor 102 are used as timing devices to control the intake and exhaust phases as well as the fuel injection and ignition processes. The intake and exhaust takes place through ports 150 and 130 in the engine's block 132 with the vanes 122 and 120 acting as the valves in the same manner as the piston in a two-stroke reciprocating engine. The vanes 122 of the expansion rotor 104 are also provided with a transfer passage 128. This passage allows the compression of the fuel/air mixture into the combustion chamber 204, and immediately following that, it exposes the continuous ignition device 158 by which the fuel/air mixture is ignited. There is also an exhaust port 130 in the expansion vanes 122 which allows the exhaust gas to escape through the expansion rotor 104 during the exhaust phase.

The fuel delivery is by direct fuel injection from a relatively simple fuel injection system. There is a fuel injector 146 for each of the compressors 102. Direct injection has benefits over indirect injection in that good atomization of the fuel occurs due to the increased pressure of delivery of a direct injection system. Typically, the injectors of a direct injection system are exposed to the direct heat of combustion and are susceptible to erosion; however, the injectors 146 of the engine 100 are masked from the direct heat of combustion by their location in the compression chamber 202, which is separate from the combustion chamber 204 so the injectors' longevity should be increased. The injection is physically timed by the vanes 120 of the compressor 102. This reduces the complexity of the fuel injection system because there is no need to pulse the injectors 146. The system need only adjust the flow rate of the injectors 146 according to the air flow characteristics. The fuel injectors 146 are plumbed to a common fuel rail (not shown), which is supplied via an appropriate fuel pump (not shown).

The ignition system is also simplified. The ignition source 158 is located next to the combustion chambers 204, with one ignition source 158 required per compressor 102. The ignition is physically timed by the vanes 122 of the expansion rotor 104, which eliminate the need for a separate ignition distributor. The ignition source 158 is the same principle as that of the glow plug used in diesel engines. The source is heated to a constant temperature depending upon the thermal requirements of the compressed fuel/air mixture. The fuel/air mixture is then exposed to the ignition source 158 via the transfer passages 128 of the expansion vanes 122. That burning portion of the mixture then ignites the remainder of the mixture in the combustion chamber 204. A timed spark-ignition system can also be implemented. The benefit of such a system is that the timing of the ignition event can be adjusted to match the combustion characteristics of the engine.

Lubrication is supplied from the oil pump 142, which is driven by the compressor drive shaft 114. The oil is pumped to the oil distribution channel 144 where it is distributed to each lubrication channel 144 located in each of the block sectors 166, where it is circulated to the gears and bearings and any other necessary areas and then returned via oil return passages 145 in the hollow drive shafts of the compressors 102 to the oil sump 140. The oil is kept away from the high temperature areas of the engine; therefore, it should not accumulate contaminants as readily nor get as hot as in conventional engines. This will increase the intervals between required oil changes.

An air cooled cooling system is anticipated to be adequate for cooling the engine 100, although a water cooled system can be implemented, if necessary. The hottest areas of the engine 100 are at its periphery, where it is most easy to take away extra heat. The periphery of the engine is finned and air is supplied via the fan 138 driven from the main shaft 106. This fan 138 could be replaced with a water pump if necessary and the fins 139 could be replaced by a water jacket.

The vanes 120 of the compressors 102 only need to maintain a seal during the compression and expansion phases. Because these phases occur in a relatively short time and within a small amount of actual rotor 102 and 104 rotation, the friction due to sealing can be greatly reduced. A large percentage of the compressors' rotation can be unencumbered with sealing devices. The vanes 122 of the expansion rotor 104 must, however, maintain an adequate seal for the entire rotation of the rotor 104. Sealing during these phases should be achieved by manufacturing tolerances sufficient to seal without actual contact of moving parts. The geometry of the vanes 120 and 122 of the rotors 102 and 104 combined with surface patterns on the walls of their respectivechambers are believed to be adequate to stimulate enough turbulence to choke any leakage. There is also sufficient room in which to incorporate positive contact sealing devices if necessary.

The ends of the secondary and primary vanes 120 and 122 must mesh as tightly as possible in order to seal and separate the phases of the thermodynamic cycle. Those sealing end surfaces 184, 185 and 186 are based upon portions of a helix generated about a torus. The following are the underlying mathematics for determining any cartesian point upon such a surface:

$X = \sin(-\alpha/2 + \phi) * \text{RADIUS}$.
$Y = \cos(-\phi/\text{GEAR RATIO}) * ((\cos(-\alpha/2 + \phi) * \text{RADIUS}) + \text{center-DIST})$.
$Z = \sin(-\phi/\text{GEAR RATIO}) * ((\cos(-\alpha/2 + \phi) * \text{RADIUS}) + \text{CENTER-DIST})$.

where:

$\alpha$ = The included angle of the end of an expansion vane as measured from the axis of rotation of a compressor (FIG. 11).

$\phi$ = An angular increment used to determine the angular resolution of the surface (FIG. 18).

RADIUS = The two-dimensional distance in the plane of the compressor from the axis of rotation of the compressor to the point in question (FIG. 11).

GEAR RATIO = The number of revolutions of a compressor per revolution of the expansion rotor.

CENTER-DIST = The perpendicular distance between the axis of rotation of the compressor to the axis of rotation of the expansion rotor (FIG. 11).

These equations represent the meshing surface 184 and 185 for an expansion vane 122. The equations are bounded from $-\alpha/2$ to $\alpha/2$ by angular steps of size $\phi$. The meshing surface 186 of the secondary vane 120 is some portion of the surfaces 184 and 185 generated for the expansion vane 122. The attributes of the interaction of the meshing surfaces 184 and 185 and 186 can be modified depending upon which portion between $-\alpha/2$ and $\alpha/2$ is used, keeping in mind that the total portion should be equal to the included angle of the end of a secondary vane ($\beta$ in FIG. 12).

FIGS. 35A-35B and 36A-36B respectively show a primary vane 122 from the engine 100 of FIGS. 10-15 and a primary vane 250 for a variation of the engine 100 in which the separate combustion chamber 204 (FIGS. 20-24) is eliminated. In this engine, a combustion chamber is formed dynamically due to a revised vane geometry. This eliminates the need for the transfer passage 128 in the primary vane 122. Side 252 of the primary vane 250 has a much different angle than the corresponding side 254 of the primary vane 122. By eliminating the fixed combustion chamber 204 and the transfer passage 128, the amount of residual exhaust gas remaining at the completion of each cycle is significantly reduced. This also reduces the potential dilution of the fresh air-fuel mixture and should greatly contribute to combustion efficiency.

FIGS. 37A-37B and 38A-38B illustrate the difference between secondary vane 120 of engine 100 of FIGS. 10-15 and secondary vane 256 for the engine without the fixed combustion chamber 204. Side 258 has a different angle than the corresponding side 260 of the secondary vane 120.

Figure 39B:
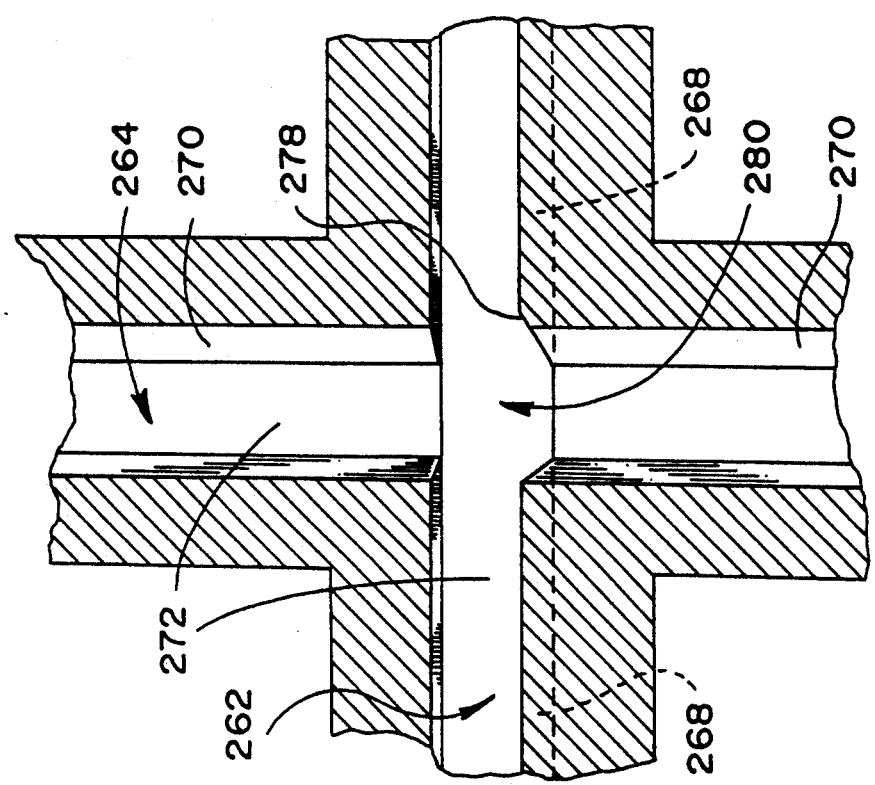
FIGS. 39A and 39B are corresponding plan views of vane tracks for the engine of FIGS. 10-15 and the further embodiment of an engine in accordance with the invention.
Figure 39A:
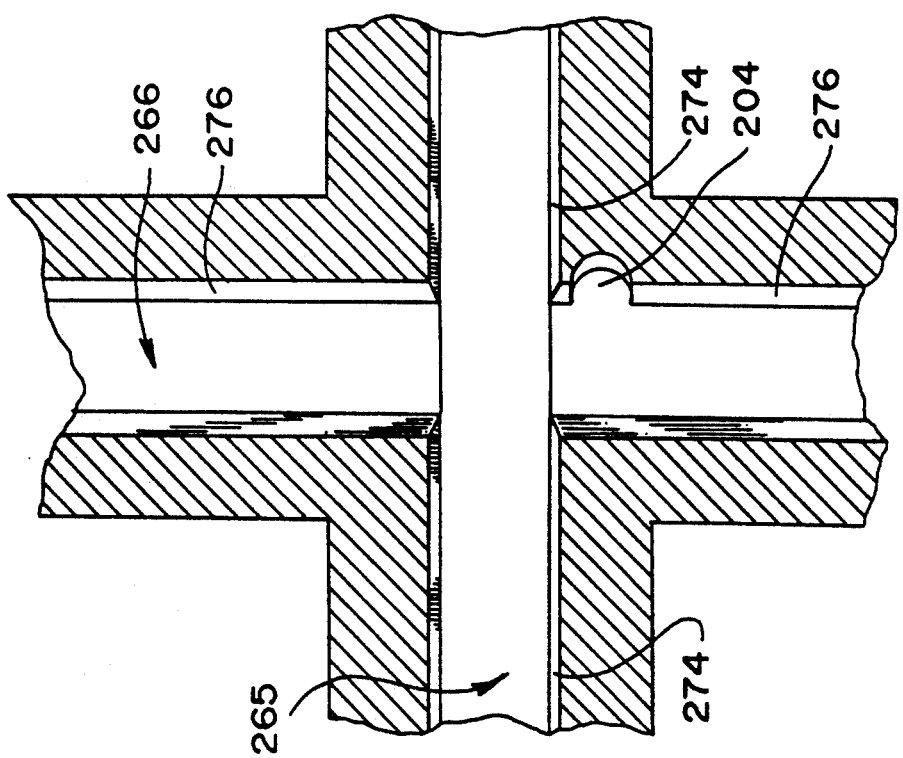

FIGS. 39A and 39B show changes in a secondary vane track 262 and a primary vane track 264 for the engine using secondary vane 256 and primary vane 250, compared with a secondary vane track 265 and a primary vane track 266 for the engine 100 of FIGS. 10-15, using the secondary vane 120 and the primary vane 122. Surfaces 268 and 270 have different angles with respect to bottoms 272 of the secondary vane track 262 and primary vane track 264, compared with the corresponding surfaces 274 and 276 in the secondary vane track 265 and the primary vane track 266. Combustion chamber 204 in the primary vane track 266 has been eliminated in the primary vane track 264. A chamfer 278 is present at intersection 280 between the secondary vane track 262 and the primary vane track 264.

Briefly, in review of FIGS. 24 and 20-23, in FIG. 24, the compression chamber 202 is at its maximum volume. As the vanes 120 and 122 continue to rotate in their respective directions, the volume of the compression chamber 202 is reduced, as shown by FIG. 20, and the contents of the compression chamber 202 are directed via the transfer passage 128 in the expansion vane 122, as shown by FIG. 21, into the combustion chamber 204.

Figure 42:
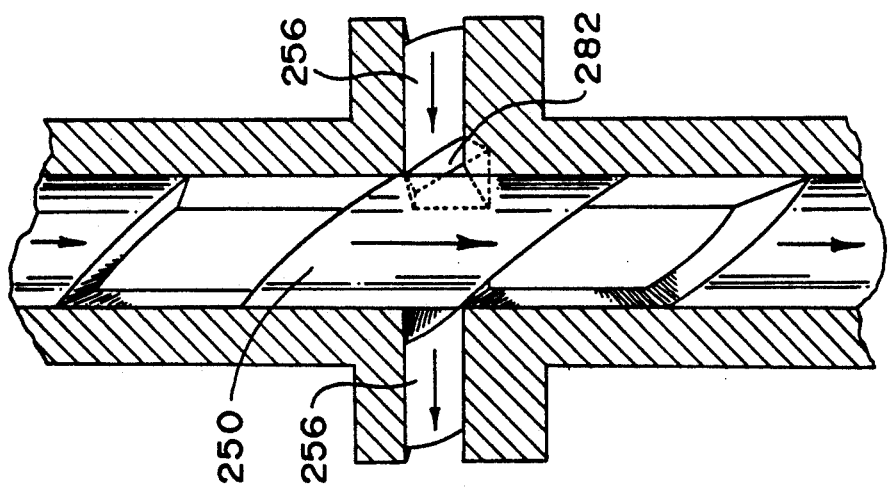
FIGS. 40-44 are sequential diagrams of a portion of the further embodiment of an engine in accordance with the invention, showing its operation.
Figure 41:
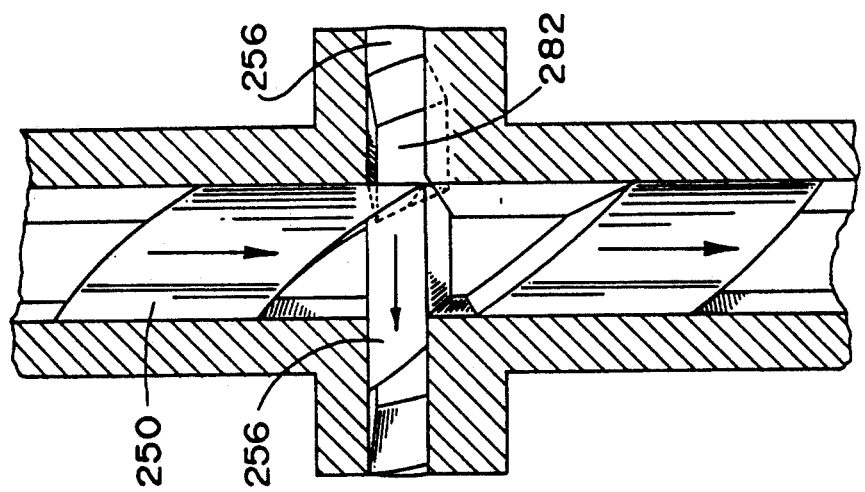
Figure 40:
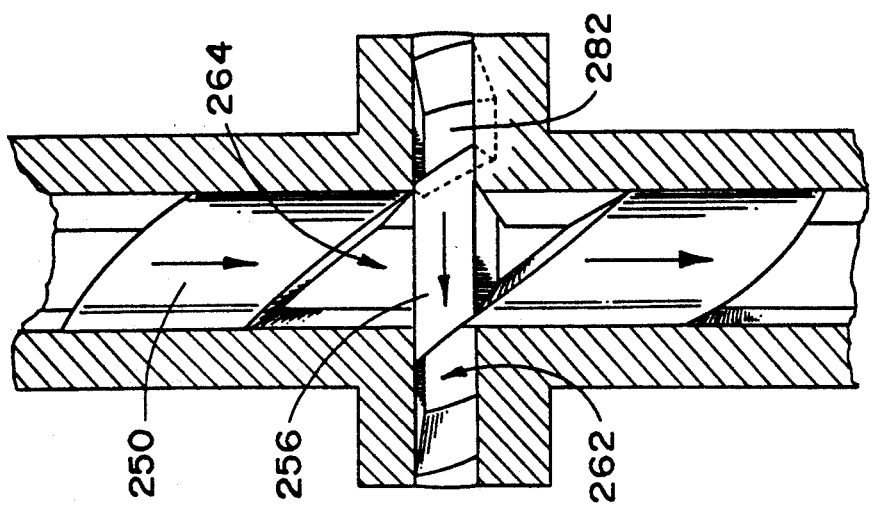
Figure 44:
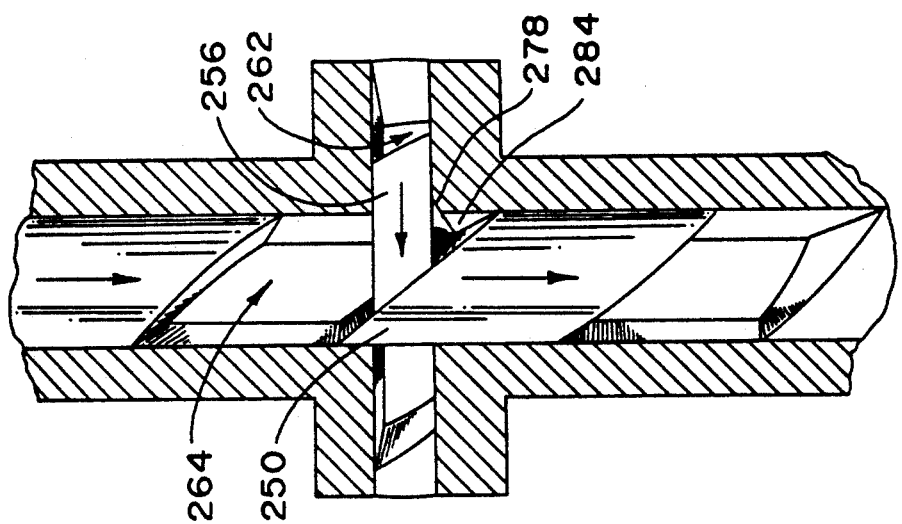
Figure 43:
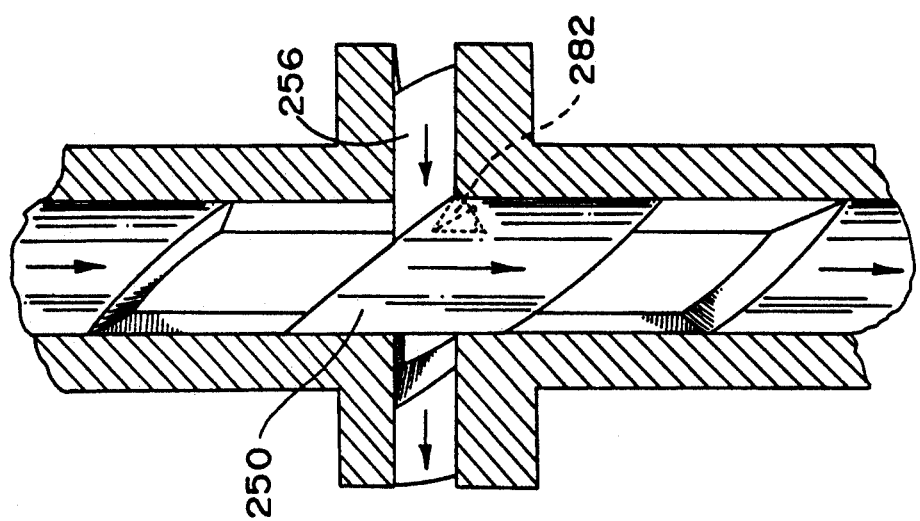

FIG. 40 shows compression chamber 282 at its maximum volume. As the secondary vane 256 and the primary vane 250 continue to rotate in their respective directions, the volume of the compression chamber 282 is reduced, as shown in FIGS. 41 and 42. By FIG. 43, the compression chamber 282 is completely defined by the vane 250 and 256 geometry and begins to take on the shape of a tetrahedron. FIG. 44 shows the final shape of the compression chamber. At this point, the compression chamber becomes the combustion chamber 284. The combustion chamber 284 is in the shape of an inverted tetrahedron. Between FIGS. 43 and 44, the contents of the original compression chamber 282 as shown in FIG. 40 are transferred to the tetrahedral combustion chamber 284, as the combustion chamber 284 is formed, via the chamfer 278 between the secondary track 262 and the primary track 264. The volume defined by this small chamfer 278 is significantly smaller than the total minimum volume of the dynamically formed clearance volume and represents the only volume responsible for residual exhaust within the engine. Other than as shown and described, the construction and operation of an engine using the modified geometry and mode of operation of FIGS. 35A-44 is the same as that of the engine 100 of FIGS. 10-15 and engine 10 of FIGS. 1-9.

Figure 45:
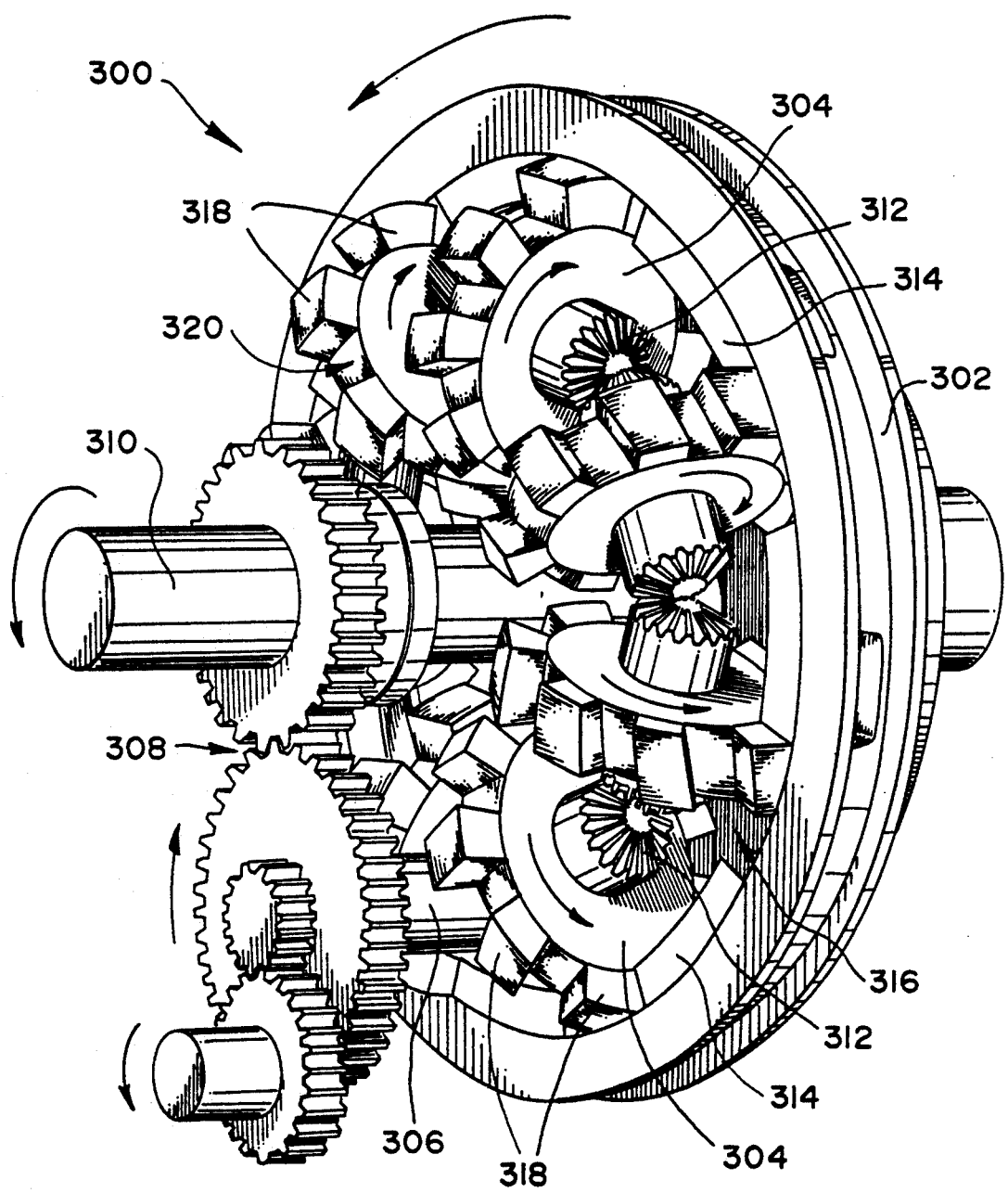
FIG. 45 is a perspective view of an intersecting vane machine in accordance with the invention that can be used as a positive displacement compressor, expander or pump.

FIG. 45 shows a machine 300 that can be used as a positive displacement compressor, expander or pump, depending upon the volumetric ratios of chambers defined by a single primary rotor 302 and a plurality of secondary rotors 304 and the communication path between those chambers. FIG. 45 shows eight secondary rotors 304 radially oriented about the spin axis of the primary rotor 302. The secondary rotors 304 are driven with a secondary driveshaft 306, only one of which is shown in FIG. 45. The secondary driveshaft 306 is geared at 308 to primary driveshaft 310, and at its other end, to one of the secondary rotors 304. The remainder of the rotors 304 are then daisy chained, as shown at 312. More than one secondary driveshaft 306 can be used if necessary. The primary rotor 302 has a plurality of primary vanes 314, in between which are defined a plurality of primary chambers 316. The secondary rotors 304 each have a plurality of secondary vanes 318, in between which are defined a plurality of secondary chambers 320. The number of secondary vanes 318 and secondary chambers 320 is a function of the number of primary vanes 314 and the GEAR RATIO between the primary and secondary rotors 302 and 304. It is the interaction of the primary and secondary vanes 314 and 318 and the chambers 316 and 320 thus formed which allow sufficient volumetric changes to occur to provide the necessary pumping action of a compressor, expander or pump.

Figures 46A, 46B:
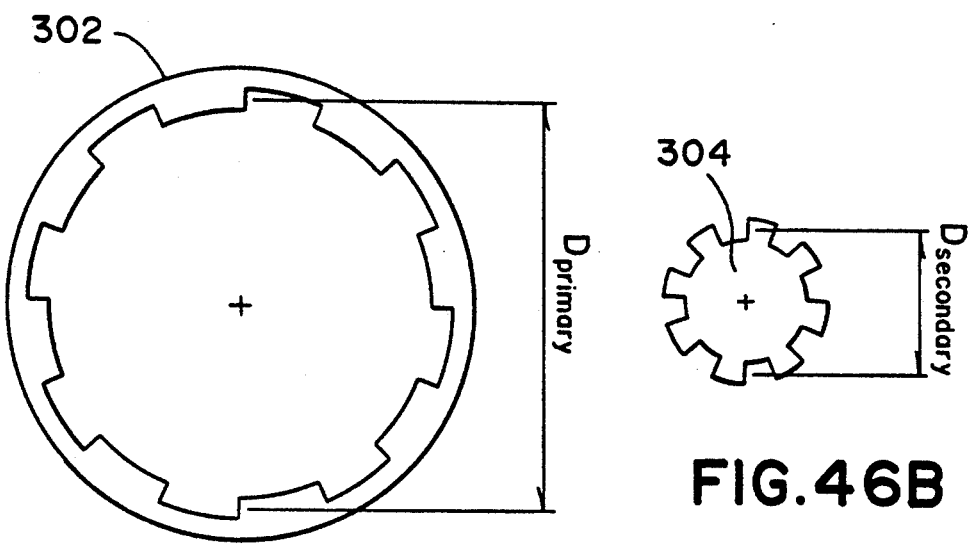
FIGS. 46A-46B and FIGS. 47A-47B are plan and end views of rotors used in the intersecting vane machines of FIGS. 10-15 and FIG. 45.
Figures 47A, 47B:
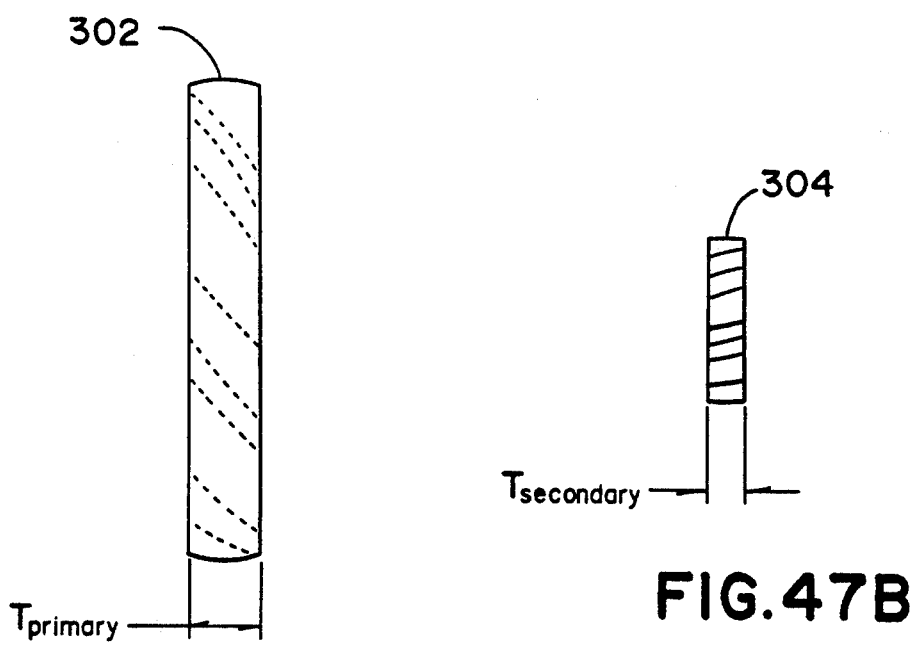
Figure 52:
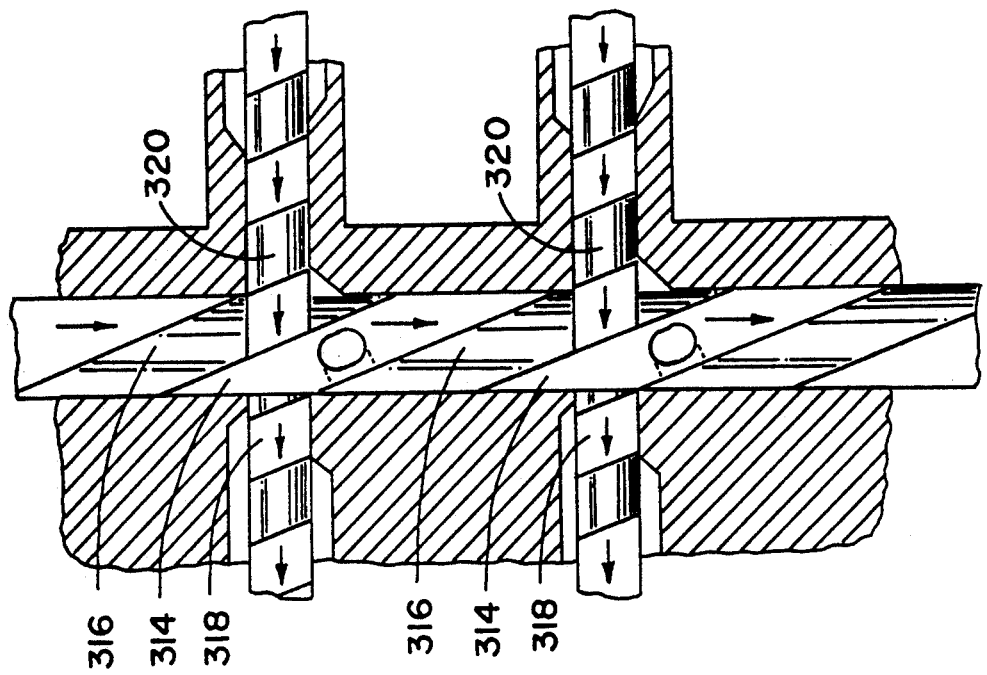
FIGS. 51-54 are sequential diagrams of a portion of the machine of FIG. 45, showing its operation.
Figure 51:
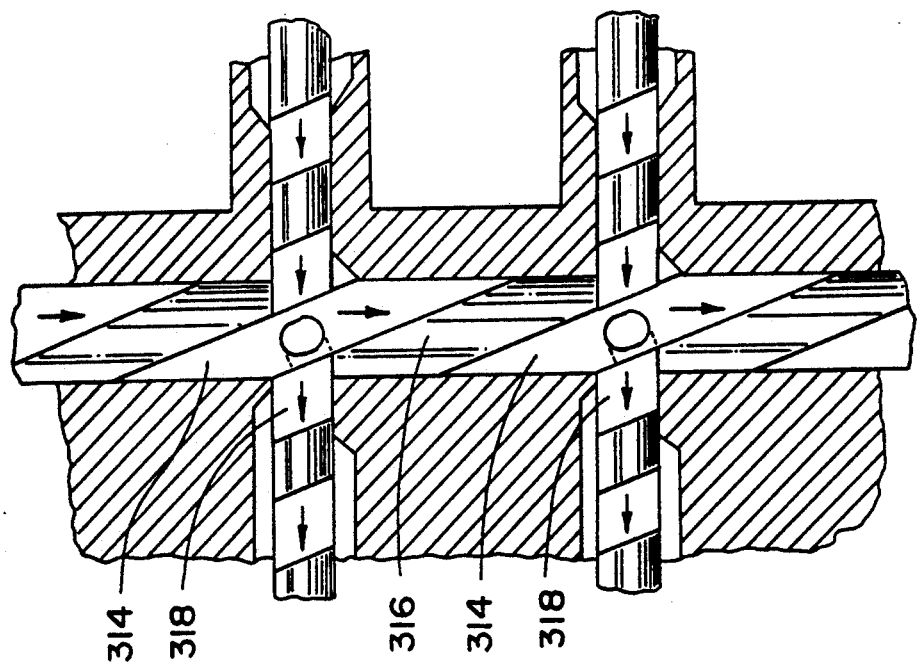
Figure 54:
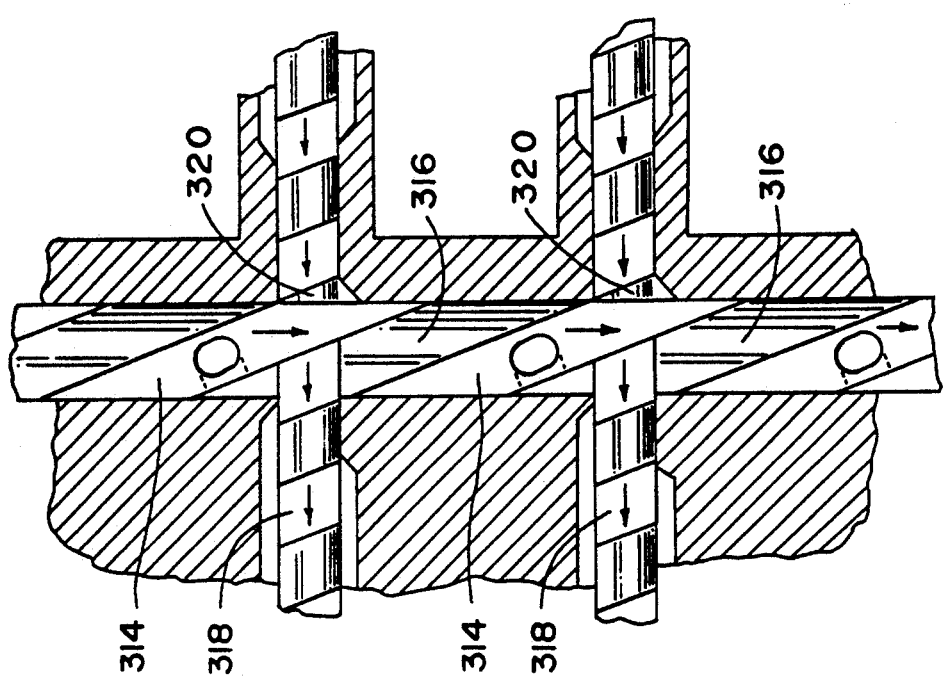
Figure 53:
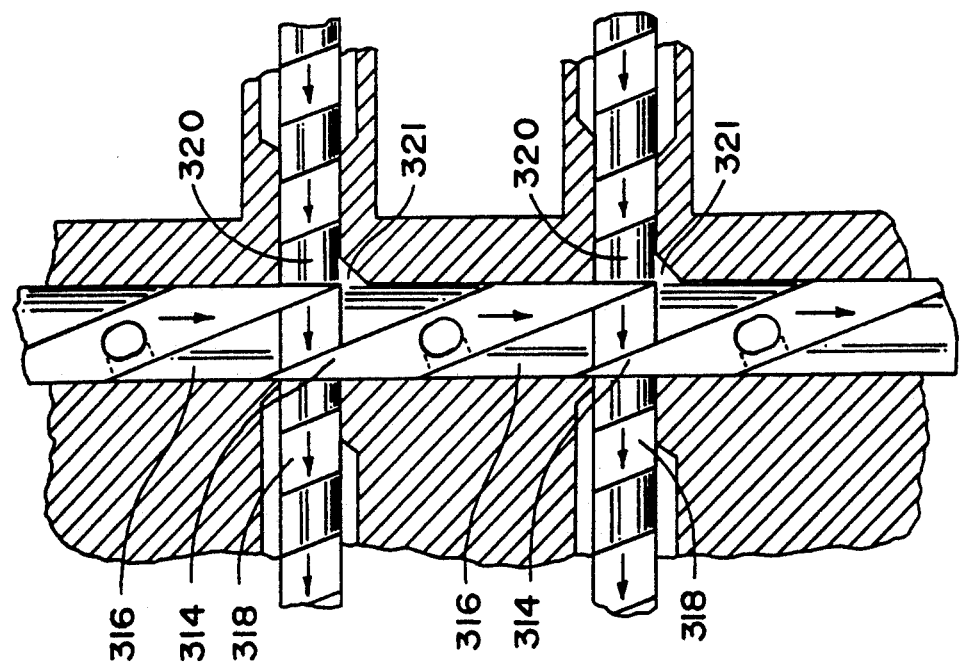

The volumetric ratios between the volumes of the primary and secondary chambers 316 and 320 can be altered by several parameters. The first parameter is the ratio of the mean diameter, Dprimary, of the primary chambers 316 as determined by the primary rotor 302 to the mean diameter, Dsecondary, of the secondary chambers 320 as determined by the secondary rotors 304, as shown in FIGS. 46A and 46B. The second parameter is the ratio of the thickness, Tprimary, of the primary chambers 316 as determined by the thickness of the primary rotor 302 to the thickness, Tsecondary, of the secondary chambers 320 as determined by the thickness of the secondary rotors 304, as shown in FIGS. 47A and 47B. The third parameter is the ratio of the radial included angles $\gamma$ and $\theta$ between that of a chamber and a vane, as shown in FIGS. 48A-49B. The sum of $\gamma$ and $\theta$ equal some value which is determined by other aspects of the geometry, but both $\gamma$ and $\theta 0$ can be assigned different values, so long as their sum remains constant. Notice that, if the value of $\gamma$ is decreased for the secondary vane of a secondary rotor 322, then the value of $\gamma$ is decreased for the primary chamber of a primary rotor 324. This is necessarily so, due to the fact that the duration of a chamber has to be equal to the duration of a vane on the interacting rotor. The fourth parameter is the gear ratio between the primary driveshaft 310 and the secondary driveshaft 306. FIGS. 46A and 46B show primary and secondary rotors 302 and 304 with a gear ratio of 1:1. Notice that the number of vanes 314 and 318 for each rotor is equal. FIGS. 50A and 50B show the primary rotor 302 and a secondary rotor 326 with a gear ratio of 2:1. This means that the secondary rotor 326 spins with twice the angular velocity of the primary rotor 302. Therefore, the number of vanes 328 has been halved in comparison to the secondary rotor 304 of gear ratio 1:1. This change in gear ratio has effectively doubled the displacement that the secondary rotors 326 can process for each rotation of the primary rotor.

Figure 55:
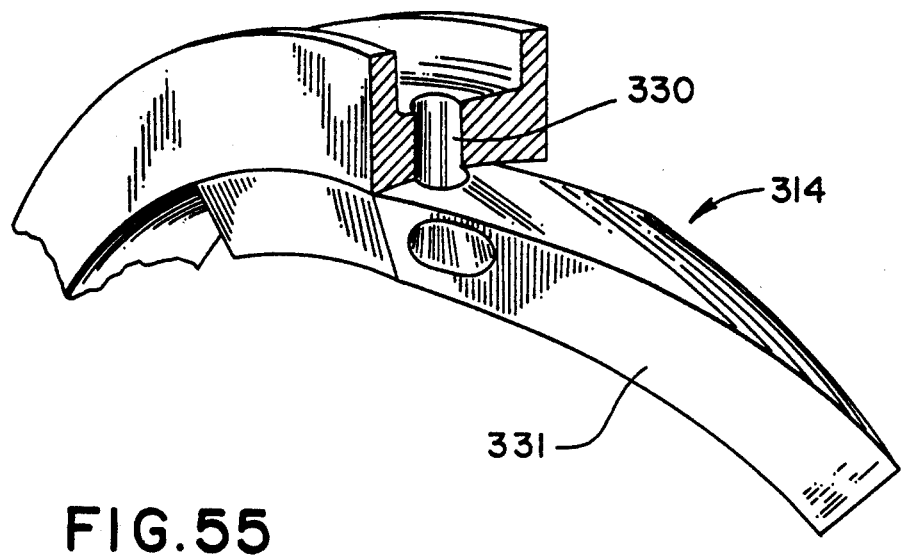
FIGS. 55 and 56 are perspective views of a primary vane for the machine of FIG. 45.
Figure 56:
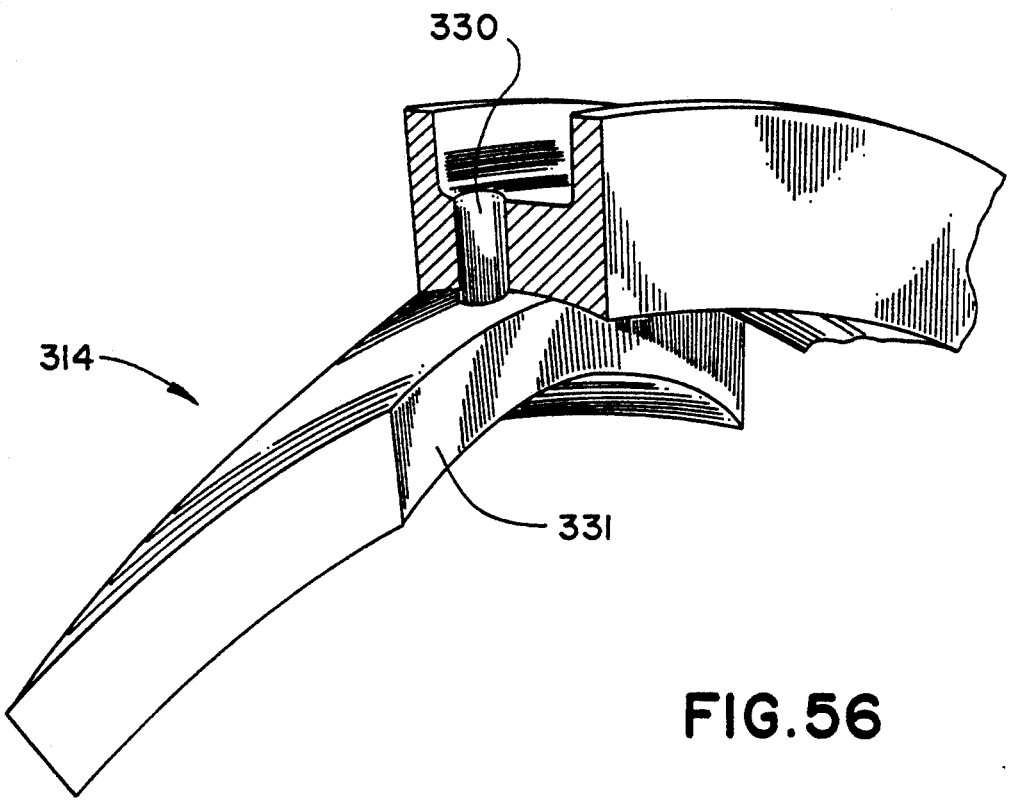

FIGS. 51-54 represent a sequence of vane 314 and 318 interaction. A working medium can be directed into the machine 300 through any suitable arrangement of ports, which can be throttled if desired, and an internal medium can be directed out of the machine through similar ports. FIG. 55 shows a port 330 incorporated into the primary vane 314. As the vane 314 of one rotor 302 moves away from the vane 318 of the other rotor 304, the volume of a chamber 316 or 320 increases. As the vane 314 of one rotor 302 moves towards the vane 318 of the other rotor 304, the volume of the chamber 316 or 320 decreases. The volumes of four chambers 316 or 320 are being altered simultaneously at each interaction point. The number of interaction points depends on the number of secondary rotors.

By supplying a suitable passage 321 between chambers 316 and 320, the contents of one chamber 316 or 320 can be directed into another chamber 320 or 316 and, depending on which way the rotors 302 and 304 are spinning, the volumetric ratios between primary and secondary chambers 316 and 320, and the location of the passages and ports, the machine 300 can be configured as a compressor, expander or pump, or any combination thereof.

Figure 59:
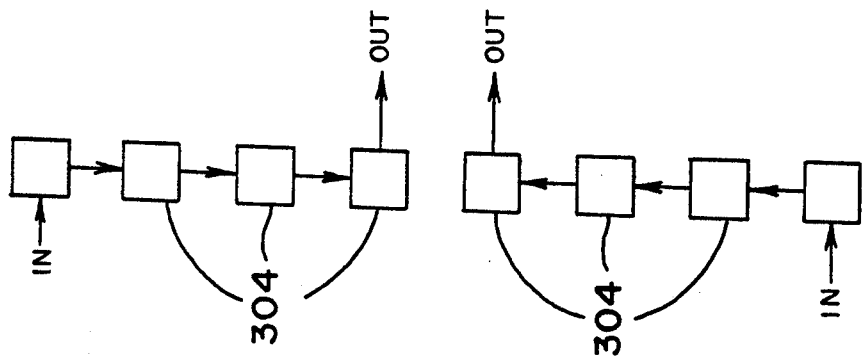
FIGS. 57-59 are block diagrams of different configurations for the machine of FIG. 45.
Figure 58:
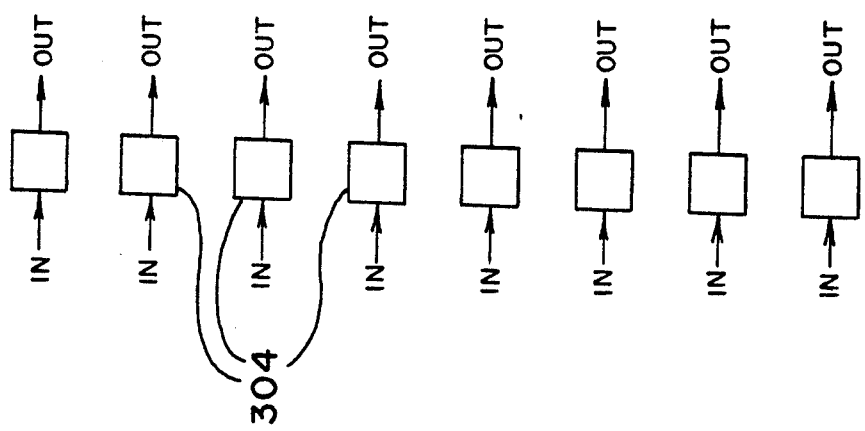
Figure 57:
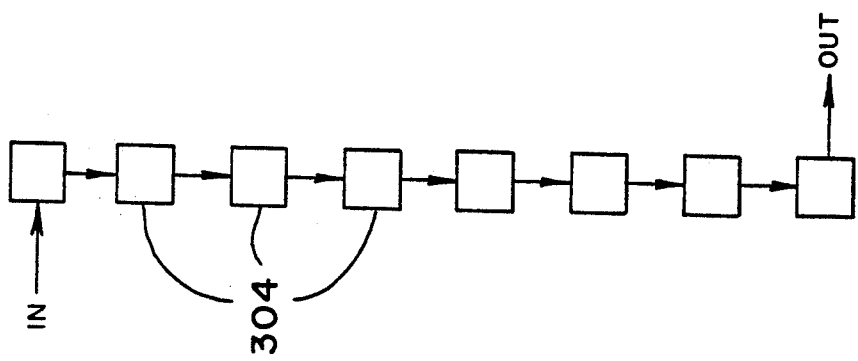

FIGS. 57-59 are block diagrams of a few potential variations of the machine 300. FIG. 57 shows all of the secondary rotors 304 operating in series. By varying the volumetric ratios from rotor to rotor, the machine 300 could act as a multi-stage compressor or expander. FIG. 58 shows all of the secondary rotors 304 acting in parallel. This arrangement is suitable as a pump for pumping the same or different kinds of medium. FIG. 59 shows the machine 300 configured with a combination of secondary rotors 304 in series and in parallel. There are, of course, many additional ways that the machine 300 could be configured.

The ends 331 of the primary vanes 314 must mesh as tightly as possible with the ends of the secondary vanes 318 in order to seal and separate the primary and secondary chambers 316 and 320. These end surfaces, or meshing surfaces, are based upon portions of a helix generated about a torus.

Other than as shown and described, the construction and operation of the machine 300 is the same as that of the engine described with FIGS. 35A-44 and the engine 100 of FIGS. 10-15.

It should now be readily apparent to those skilled in the art that a novel toroidal hyper-expansion rotary engine capable of achieving the stated objects of the invention has been provided. The engine of this invention takes increased advantage of the potential efficiencies of an intersecting vane machine.

It should further be apparent to those skilled in the art that various changes in form and details of the invention as shown and described may be made. It is intended that such changes be included within the spirit and scope of the claims appended hereto.

What is claimed is:

1. An intersecting vane machine, which comprises a supporting structure having an inside surface, first and second intermeshing rotors rotatably mounted in said supporting structure, said first rotor having a plurality of first vanes positioned in spaced relationship on a radially inner peripheral surface of said first rotor with said radially inner peripheral surface of said first rotor and a radially inner peripheral surface of each of said first vanes being transversely concave, with spaces between said first vanes and said inside surface defining a plurality of primary chambers, said second rotor having a plurality of second vanes positioned in spaced relationship on a radially outer peripheral surface of said second rotor with said radially outer peripheral surface of said second rotor and a radially outer peripheral surface of each of said second vanes being transversely convex, with spaces between said second vanes and said inside surface defining a plurality of secondary chambers, with a first axis of rotation of said first rotor and a second axis of rotation of said second rotor arranged so that said axes of rotation do not intersect, said first rotor, said second, first vanes and second vanes being arranged so that said first vanes and said second vanes intermesh at only one location during their rotation.

2. The machine of claim 1 in which said first vanes and said second vanes have ends which are substantially configured as portions of a helix generated about a torus with said ends being used as meshing surfaces as said first and second vanes intermesh.

3. The machine of claim 1 additionally comprising a means of power take-off operatively coupled to said first and second rotors.

4. The machine of claim 1 comprised of said first rotor and a plurality of said second rotors, said first rotor having a transversely concave inner surface with a plurality of said first vanes attached to said radially inner peripheral surface, said second rotors having a transversely convex outer surface with a plurality of said second vanes attached to said radially outer peripheral surface, said first vanes becoming primary vanes and said second vanes becoming secondary vanes.

5. The machine of claim 4 in which said second rotors are radially positioned about said first axis of rotation of said first rotor.

6. The machine of claim 5 in which said supporting structure comprises a plurality of wedge-shaped sectors, with said second rotors being encapsulated between adjacent sectors.

7. The machine of claim 4 additionally comprising a means of power take-off operatively coupled to said first and second rotors.

8. The machine of claim 4 in which said first rotor has a first driveshaft, said second rotors are geared together and driven by a second driveshaft, with said first driveshaft being geared to said second driveshaft.

9. The machine of claim 8 in which a gear ratio between said first driveshaft and said second driveshaft is 1:1.

10. The machine of claim 8 in which a gear ratio between said first driveshaft and said second driveshaft is other than 1:1.

11. The machine of claim 8 in which said first driveshaft and said second driveshaft are geared together with a gear ratio so that a change in said gear ratio gives a direct change in included angles of said secondary vanes and said secondary chambers.

12. The machine of claim 4 in which said second rotors have a number of said secondary vanes equal to (1/GEAR RATIO) X (number of said primary vanes on said first rotor) where GEAR RATIO equals revolutions of each of said second rotors per revolution of said first rotor.

13. The machine as in any one of claims 4–12 in which the machine is configured as a compressor, pump or expander and an external means for supplying input power is connected to drive said first and second rotors.

14. An intersecting vane machine, which comprises a supporting structure having an inside surface, first and second intermeshing rotors rotatably mounted in said supporting structure, said first rotor having a plurality of first vanes positioned in spaced relationship on a radially inner peripheral surface of said first rotor, with spaces between said first vanes and said inside surface defining a plurality of primary chambers, said second rotor having a plurality of second vanes positioned in spaced relationship on a radially outer peripheral surface of said second rotor, with spaces between said second vanes and said inside surface defining a plurality of secondary chambers, said first rotor, second rotor, first vanes and second vanes being positioned and configured so that said second vanes engage said first vanes and inside surface of said supporting structure as said first and second rotors rotate with respect to each other to form a substantial clearance volume or combustion chamber as a result of a dissimilarity in shape between a first cross-sectional geometry of said first vanes and a second cross-sectional geometry of said second vanes as said first and second vanes engage within said supporting structure, with said first and second cross-sectional geometries being transverse to a first direction of rotation of said first rotor and a second direction of rotation of said second rotor respectively.

15. The machine as in any one of claims 4–12 or 14 in which the machine is configured as a compressor, pump or expander and an external means for supplying input power is connected to drive said first and second rotors.

16. The machine as in any one of claim 4–12 or 14 configured as an internal combustion engine in which said secondary chambers become intake/compression chambers and said primary chambers become expansion/exhaust chambers with said intake/compression chambers in communication with a suitable intake port for the inlet of a working medium and said expansion/exhaust chambers in communication with a suitable exhaust port for the expulsion of said medium.

17. The engine of claim 16 in which there is at least one fuel injector on said supporting structure, said fuel injector being configured and positioned to provide fuel by direct injection to said intake/compression chambers.

18. The engine of claim 16 in which there is at least one ignition device on said supporting structure, said ignition device being configured and positioned to ignite a quantity of fuel.

19. The engine of claim 16 in which said engine is operable in intake, compression, expansion and exhaust phases, and duration of said phases relative to degrees of said first rotor rotation substantially equals:

Intake (degrees) = $(360.0 - \alpha)$/GEAR RATIO,
Compression (degrees) = $(\alpha + \beta)$/GEAR RATIO,
Expansion (degrees) = $\alpha - \beta + \theta$,
Exhaust (degrees) = $\delta$, where:
$\alpha$ = an included angle of an end of one of said primary vanes as measured from an axis of rotation of one of said second rotors,
$\beta$ = an included angle of an end of a secondary vane as measured from the axis of rotation of said first rotor,
$\gamma$ = an included angle of a side of an intake/compression chamber as measured from the axis of one of said second rotors,
$\theta$ = an included angle of a side of an expansion/exhaust chamber as measured from an axis of rotation of said first driveshaft,
$\delta$ = an included angle of a radial orientation of said second rotors as measured from the axis of rotation of said first rotor, and
GEAR RATIO = a number of revolutions of one of said second rotors per revolution of said first rotor.

20. The engine of claim 19 in which said first rotor and said second rotors are configured and positioned relative to one another so as to permit changes in said phases by varying a number of said second rotors, are geared together so as to permit a change in Gear Ratio of gears gearing together said first rotor and said second rotors, or to permit a change in included angles of said secondary vanes, said intake/compression chambers, said primary vanes or said expansion/exhaust chambers.

21. A method of dynamically forming a substantial clearance volume or combustion chamber within an intersecting vane machine, which comprises providing a first vane and a second vane being contained within a supporting structure, said first and second vanes each having a dissimilarity in shape between a first cross-sectional geometry of said first vane and a second cross-sectional geometry of said second vane, with said first cross-sectional geometry being transverse to a first direction of travel of said first vane and said second cross-sectional geometry being transverse to a second direction of travel of said second vane, said first direction of travel of said first vane intersecting said second direction of travel of said second vane, said first and second vanes additionally providing a first and a second meshing surface respectively, with substantial clearance volume or combustion chamber being defined by said first and second meshing surfaces and said supporting structure at an instance or complete engagement of said first and second meshing surfaces of said first and second vanes, and moving said first and second vanes with respect to one another in said first and second directions of travel so that said first and second meshing surfaces form said substantial clearance volume or combustion chamber.

22. An engine, which comprises an engine block having an inside surface, first and second intermeshing rotors rotatably mounted in said engine block, said first rotor having a plurality of intake/compression vanes positioned in spaced relationship on a radially inner peripheral surface of said first rotor and said second rotor having a plurality of expansion/exhaust vanes positioned in spaced relationship on a radially outer peripheral surface of said second rotor, said intake/-compression vanes being positioned on said first rotor relative to said expansion/exhaust vanes on said second rotor and said first and second rotors and said intake/-compression vanes and expansion/exhaust vanes having a shape to allow said intake/compression vanes to engage said expansion/exhaust vanes and said inside surface of said engine block to form intake/compression and expansion/exhaust chambers between said first and second rotors as said first and second rotors rotate with respect to each other, said intake/compression chambers being separate from said expansion/exhaust chambers and said expansion/exhaust chambers each having a greater volume than each of said intake/compression chambers, said first and second rotors each having both said intake/compression vanes and said expansion/exhaust vanes.

23. The engine of claim 22 in combination with a pair of output shafts each operatively coupled to one of said first and second rotors to provide a means of power take-off from said first and second rotors.

24. The engine of claim 23 in which said pair of output shafts are each operatively coupled to one of said first and second rotors by bevel gears on said pair of output shafts and on said first and second rotors.

25. The engine of claim 24 in which said pair of output shafts are engaged to one another by means of spur gears on said pair of output shafts.

26. An engine, which comprises an engine block having an inside surface, first and second intermeshing rotors rotatably mounted in said engine block, said first rotor having a plurality of intake/compression vanes positioned in spaced relationship on a radially outer peripheral surface of said first rotor and said second rotor having a plurality of expansion/exhaust vanes positioned in spaced relationship on a radially inner peripheral surface of said second rotor, said intake/-compression vanes being positioned on said first rotor relative to said expansion/exhaust vanes on said second rotor and said first and second rotors and said intake/-compression vanes and expansion/exhaust vanes having a shape to allow said intake/compression vanes to engage said expansion/exhaust vanes and said inside surface of said engine block to form intake/compression and expansion/exhaust chambers between said first and second rotors as said first and second rotors rotate with respect to each other, said intake/compression chambers being separate from said expansion/exhaust chambers and said expansion/exhaust chambers each having a greater volume than each of said intake/compression chambers, said engine having a plurality of said first rotors.

27. The engine of claim 26 in which said first rotors have first axes of rotation and said second rotor has a second axis of rotation, the first axes of rotation being angularly disposed with respect to the second axis of rotation.

28. The engine of claim 27 in which the first axes of rotation are disposed at an angle of 90 degrees with respect to the second axis of rotation.

29. The engine of claim 28 in which there are eight of said first rotors.

30. The engine of claim 29 in which said first rotors each have eight vanes and said second rotor has eight vanes.

31. The engine of claim 27 in which said first rotors are geared together and in which said engine has a first drive shaft for said first rotors.

32. The engine of claim 31 in which said engine has a second drive shaft connected to said second rotor and said first drive shaft is geared to said second drive shaft.

33. The engine of claim 32 in which a gear ratio between said second drive shaft and said first drive shaft is 1:1.

34. The engine of claim 33 in which said first rotors are positioned radially about the second rotation axis and are driven to rotate with an angular velocity equal to an angular velocity of said second rotor.

35. The engine of claim 32 in which a gear ratio between said second drive shaft and said first drive shaft is other than 1:1.

36. The engine of claim 32 in which said first rotors each have a number of said intake/compression vanes equal to (1/GEAR RATIO)×(number of said expansion/exhaust vanes on said second rotor) where GEAR RATIO equals revolutions of each of said first rotors per revolution of said second rotor.

37. The engine of claim 36 in which the number of expansion/exhaust vanes on said second rotor is at least equal to a number of said first rotors.

38. The engine of claim 36 in which said engine is operable in intake, compression, hyper-expansion and exhaust cycles and in which duration of the intake cycle in degrees is substantially equal to $(360-\alpha)$/GEAR RATIO, duration of the compression cycle in degrees is substantially equal to $(\gamma+\beta)$/GEAR RATIO, duration of the expansion cycle is substantially equal to $(\alpha-\beta+\theta)$ and duration of the exhaust cycle is substantially equal to $\delta$, where:

$\alpha$ = an included angle of an end of one of said expansion/exhaust vanes as measured from an axis of rotation of one of said first rotors, $\beta$ = an included angle of an end of an intake/compression vane as measured from the axis of rotation of said second rotor, $\gamma$ = an included angle of a side of an intake chamber as measured from the axis of rotation of one of said first rotors.

$\theta$ = an included angle of a side of an expansion chamber as measured from a center of rotation of said second drive shaft, $\delta$ = an included angle of a radial orientation of said first rotors as measured from a center of rotation of said second drive shaft, and GEAR RATIO = a number of revolutions of one of said first rotors per revolution of said second rotor.

39. The engine of claim 26 in which said expansion/exhaust vanes each have a transfer passage configured and positioned to connect one of said intake/compression chambers with a combustion chamber as said first rotors and said second rotor rotate.

40. The engine of claim 39 in which said transfer passage is further configured and positioned to expose and connect an ignition device to said combustion chamber as said first rotors and said second rotor rotate.

41. The engine of claim 40 in which said expansion/exhaust vanes each have a first exhaust port, said engine block has a second exhaust port, and said first exhaust port is configured and positioned to connect said expansion/exhaust chambers to said second exhaust port.

42. The engine of claim 41 in which there are a plurality of fuel injectors on said engine block corresponding in number to said first rotors, said fuel injectors being configured and positioned to provide fuel by direct injection to said intake/compression chambers.

43. The engine of claim 42 additionally comprising a cooling fan attached to said second rotor.

44. The engine of claim 42 in which said engine block comprises a plurality of wedge-shaped sectors, with said first rotors being encapsulated between adjacent sectors.

45. The engine of claim 26 in which said inside surface of said engine block has tracks for said intake/compression vanes and a track for said expansion/exhaust vanes, said tracks for said intake/compression vanes each having an intersection with said track for said expansion/exhaust vanes, said intersection being configured to connect said intake/compression chambers with an intermediate chamber between said intake/compression chambers and said expansion/exhaust chambers.

46. The engine of claim 45 in which said intersection includes a chamfer to connect said intake/compression chambers with said intermediate chamber between said intake/compression chambers and said expansion/exhaust chambers.

47. The engine of claim 45 in which said engine is an internal combustion engine and said intermediate chamber is a combustion chamber.

48. The engine of claim 45 in which said engine is a pump, expander or compressor, said intake/compression chambers are intake chambers, said expansion/exhaust chamber is an exhaust chamber, and a power input is connected to said engine for rotation of said rotors.

49. The engine of claim 26 in which said engine is a pump, expander or compressor, said intake/compression chambers are intake chambers, said expansion/exhaust chamber is an exhaust chamber, and a power input is connected to said engine for rotation of said rotors.

* * * * *